(12) United States Patent
Baldawa et al.

(10) Patent No.: US 11,841,780 B1
(45) Date of Patent: Dec. 12, 2023

(54) SIMULATED NETWORK OUTAGES TO MANAGE BACKUP NETWORK SCALING

(71) Applicant: Amazon Technologies, Inc., Seattle, WA (US)

(72) Inventors: Rishi Baldawa, Vancouver (CA); Shawn Patrick Jones, Fernie (CA)

(73) Assignee: Amazon Technologies, Inc., Seattle, WA (US)

( * ) Notice: Subject to any disclaimer, the term of this patent is extended or adjusted under 35 U.S.C. 154(b) by 34 days.

(21) Appl. No.: 17/548,264

(22) Filed: Dec. 10, 2021

(51) Int. Cl.
| | |
|---|---|
| *G06F 11/00* | (2006.01) |
| *G06F 11/20* | (2006.01) |
| *G06F 11/263* | (2006.01) |
| *H04L 67/1074* | (2022.01) |
| *G06F 11/30* | (2006.01) |
| *G06F 11/07* | (2006.01) |

(52) U.S. Cl.
CPC ...... *G06F 11/2025* (2013.01); *G06F 11/0709* (2013.01); *G06F 11/263* (2013.01); *G06F 11/3006* (2013.01); *H04L 67/1074* (2013.01); *G06F 11/203* (2013.01); *G06F 2201/85* (2013.01)

(58) Field of Classification Search
CPC .. G06F 11/263; G06F 11/203; G06F 11/0709; G06F 11/142; G06F 11/2023; G06F 11/2025; G06F 11/2033; G06F 11/3006; G06F 2201/85; H04L 67/1074
See application file for complete search history.

(56) References Cited

U.S. PATENT DOCUMENTS

| | | | |
|---|---|---|---|
| 8,265,980 B2 | 9/2012 | Ochs et al. | |
| 9,185,142 B2 | 11/2015 | Mussman et al. | |
| 9,589,041 B2 | 3/2017 | Tran et al. | |
| 10,860,734 B2 | 12/2020 | Hildreth et al. | |
| 11,138,177 B2 | 10/2021 | Levy et al. | |
| 2017/0242784 A1* | 8/2017 | Heorhiadi | G06F 11/3684 |
| 2019/0335345 A1 | 10/2019 | Yan et al. | |
| 2021/0160143 A1* | 5/2021 | Francis | G06Q 10/0637 |

(Continued)

OTHER PUBLICATIONS

U.S. Appl. No. 17/548,271, filed Dec. 10, 2021, Rishi Baldawa, et al.

(Continued)

*Primary Examiner* — Joseph D Manoskey
(74) *Attorney, Agent, or Firm* — S. Scott Foster; Kowert, Hood, Munyon, Rankin & Goetzel, P.C.

(57) ABSTRACT

A system is configured to simulate outages of network resources. The system is configured to provide a control plane for computing resources of a provider network. The control plane is configured to cause simulated outages of a primary region of the plurality of regions selected to host the plurality of different computing resources. During the simulated outages, the control plane moves respective workloads of the plurality of different computing resources to be performed in the one or more secondary networks and tracks a performance of the one or more secondary regions hosting the moved respective workloads of the plurality of computing resources. After completing individual ones of the simulated outages of the first network, the control plane moves the respective workloads of the plurality of different computing resources back to the primary region.

20 Claims, 11 Drawing Sheets

(56) References Cited

U.S. PATENT DOCUMENTS

2021/0200525 A1* 7/2021 Shmouely .............. H04L 43/16
2022/0231904 A1* 7/2022 Di Martino ............ H04L 67/60

OTHER PUBLICATIONS

U.S. Appl. No. 17/548,291, filed Dec. 10, 2021, Rishi Baldawa, et al.
U.S. Appl. No. 18/064,915, filed Dec. 12, 2022, Nikita Pinski, et al.

* cited by examiner

SIMULATED NETWORK OUTAGES TO MANAGE BACKUP NETWORK SCALING

BACKGROUND

Computing service providers may have computing resources distributed across different geographic regions to have physically separated facilities offering the services. The distributed geographic regions may be logically interconnected via the provider network. Regional networks may provide different amounts of computing resources per network. When one network fails, workloads at that network are offloaded to other regional networks to minimize downtime while the network is offline.

The computing resources can be dynamically allocated or deallocated based on usage over time. A secondary network may go unused or underutilized for long periods of time causing deallocation of resources. When the primary network experiences a failure, the secondary network might not be able to scale sufficiently fast enough to accommodate the redirected workloads in the event of a failure of the primary network.

Figure 1:
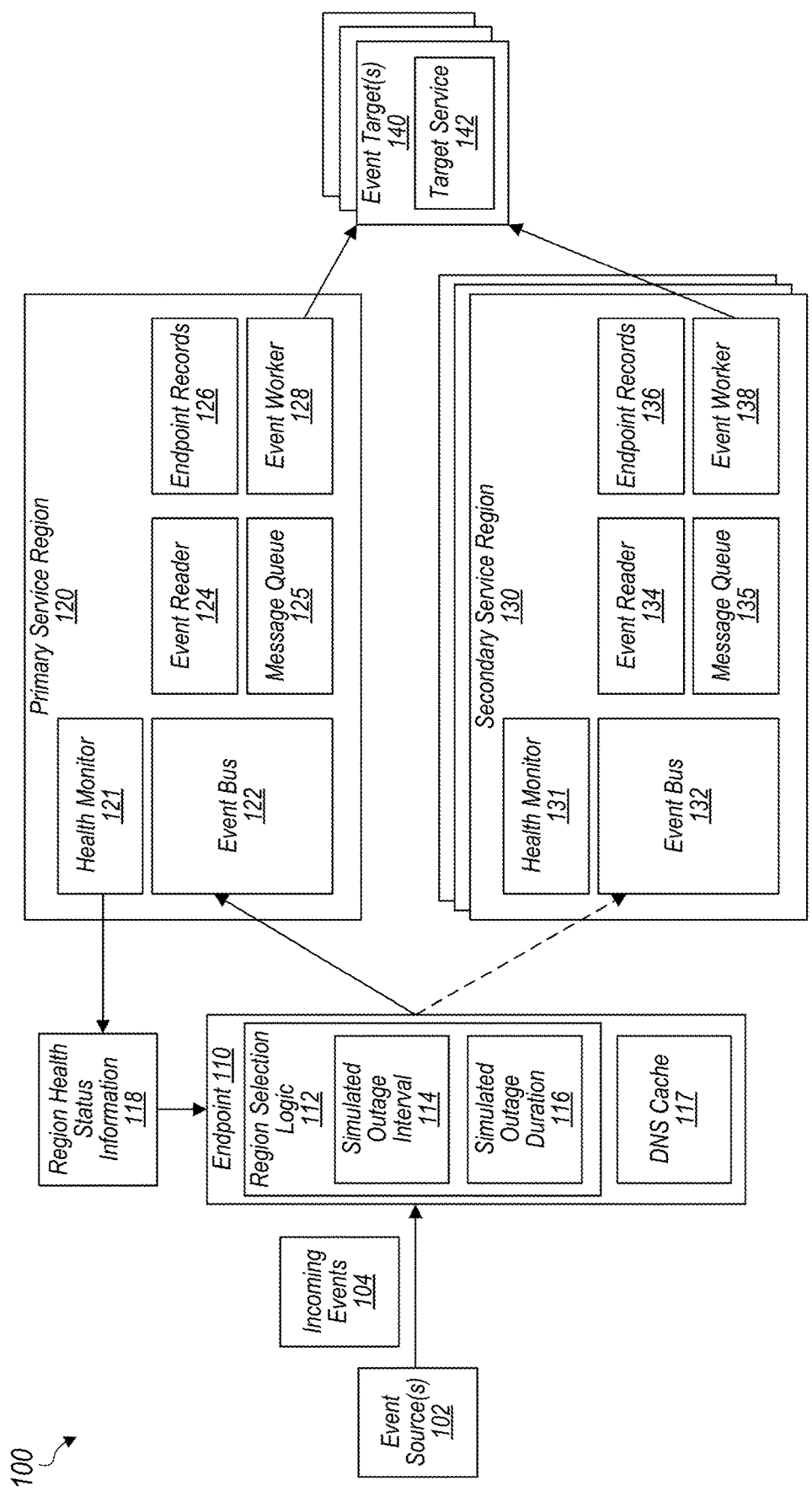
FIG. 1 illustrates a block diagram of a system configured to provide an event bus service implemented across a plurality of regions, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

DETAILED DESCRIPTION

Various systems and methods for providing a global endpoint for receiving service calls with automatic failover and recovery. In some embodiments, the service calls may include commands or events issued by clients of a computing service offered by a service provider network configured to offer various services for the clients. The commands or events may be formed by one or more computing devices in accordance with a structure provided by the service provider network. For example, the commands or events may be formed in accordance with an application programmatic interface (API) for the service. Thus, in some embodiments, the commands or events may include API calls to the service. The API calls may cause the service to perform various computing tasks on behalf of the clients.

The service provider may include various computing devices configured to perform the various computing tasks to fulfill the API calls on behalf of the clients. For example, for database systems, the service provider may include various computing devices configured to read, write, edit, add to or delete from databases maintained by the service provider. The service provider may include distributed computing systems configured to perform the various tasks on behalf of the service. In some implementations, the distributed computing systems may be located in different locations such that the computing systems are distributed across at least a subset of the different locations. In some implementations, the different locations may be referred to as availability zones or regions for which the service is provided to the clients by the service provider. For example, at least one of the distributed computing systems may be located in a first availability zone, and at least another one of the distributed computing systems may be located in a second availability zone.

In situations where the service includes a database service, the service provider may include storage devices that may be configured as data stores configured to store information pertaining to databases, such as data of the databases, metadata of the databases, schemas or structural definitions for the databases, or other information defining the databases. The service may include computing devices configured to process computing operations relating to the databases stored or managed by the data stores. For example, the service may include computing devices that may be event delivery workers configured to deliver the commands or events to the database. In other embodiments, the event delivery workers may be configured to deliver the events to the respective targets for the events.

The service may be configured to provide an endpoint for clients such that the endpoint may direct events from the clients to various regions of the service based on various criteria. The different regions of the service may be configured to process or direct the events to the target on behalf of the clients. The endpoint may be configured to direct the events to a first region based on satisfying criteria. The endpoint may also be configured to determine whether the first region is capable or adequately healthy to receive the events for processing. The endpoint may receive health status information pertaining to the first region. Based on the health status information, the endpoint may direct the events to a second region for processing of the events.

In some situations, the endpoint may direct the event to the first region, where the first region includes computing devices configured to replicate the event to the second region. The first region may include one or more computing devices configured to send a copy of the event to the second region. The first region may be configured to send a duplicate event to the second region in order to have a second region to process the event in a manner similar to that of the first region in situations when the first region has failed or is otherwise not pushing events to the target destinations.

The second region may be configured to determine whether the first region has completed processing the events that have been replicated to the second region. For example, the second region may read from a global database that indicates whether events have been processed. The first region may be configured to publish to the global database that processing of the event has been published. Thus, the second region may be configured to read the global database to determine whether the first region has published an indication that the event has been processed.

Service outages at the various regions of the service may cause increased loads in other regions of the service due to load shifting or redirection. In some situations, an unexpected outage of a primary region may cause a secondary region to become overloaded in response to events being diverted from the primary region to the secondary region. The diverted events may be provided to the secondary region by the endpoint. The secondary region may be unable to sufficiently scale operations in response to the diverted events resulting from the outage of the primary region. In some situations, a sudden influx of incoming events at a smaller region may act as a distributed denial of service attack such that the smaller region is unable to maintain stability in view of the incoming events.

The endpoint may be configured to simulate outages at arbitrary or pre-defined intervals for brief periods of time such that the endpoint would be generally restricted from directing events to a region that has a simulated outage. Based on the simulated outages, the endpoint may redirect some or all of the events from the primary region to the secondary region without the primary region having an actual outage. In some situations, the simulated outages may have a relatively short duration of time relative to the intervals between the simulated outages. For example, in some implementations, the simulated outages may be approximately 10 minutes in duration while the interval between the simulated outages may be 4 hours or more apart. After the interval elapses, the endpoint may simulate an outage and redirect events from the primary region to another region for processing the events.

During the simulated outages, the secondary region may be scaled to accommodate the limited number of redirected events. Periodic or occasional redirection of events may facilitate regularly occurring scaling for the secondary region. The secondary region may be scaled regularly to ensure that the secondary region may be prepared for an actual outage of the primary region.

In one aspect, a system for an event bus service may include one or more processors and a memory storing instructions that, when executed on or across the one or more processors, cause the one or more processors to implement an event bus service of a provider network, wherein the provider network is implemented across a plurality of regions, wherein the event bus service hosts an event bus in respective ones of the plurality of regions. The event bus service is configured to receive, from one or more event sources, events at the event bus in a first region via a network endpoint created for the event bus, wherein the first region is selected as a primary region for the event bus service, and wherein a second region of the plurality of regions is selected as secondary region for the event bus service. The event bus service is configured to direct the events to the event bus in the first region. The event bus service is configured to monitor performance of computing resources or an application in the first region, wherein events are delivered to one or more event targets by the event bus service in the primary region. The event bus service is configured to, based on the monitoring of the performance of the computing resources in the first region, detect a region change event for the event bus in the first region. After detection of the region change event, the event bus service is configured to redirect further events received from the one or more event sources via the network endpoint to the event bus in the secondary region, wherein the further events are delivered to the one or more event targets by the event bus service in the secondary region.

In another aspect, a method includes monitoring performance of a first network of a plurality of networks of a provider network, wherein events are received from one or more event sources at the event bus via a network endpoint created for the event bus and delivered to one or more event targets by the event bus service in the primary region. The method may also include detecting a region change event for the event bus in the first region. After detecting the region change event, the method may include redirecting further events received via the network endpoint to an event bus in a second region of the plurality of regions, wherein the further events are delivered to the one or more event targets by the event bus service in the secondary region.

In yet another aspect, one or more computer-readable storage media storing instructions that, when executed on or across one or more processors, cause the one or more processors to perform operations. The operations may include monitoring performance of computing resources in a first region of a plurality of regions, wherein the first region is selected as a primary region for the event bus service, and wherein a second region of the plurality of regions is selected as secondary region for the event bus service, wherein events are received from one or more event sources at the event bus via a network endpoint created for the event bus and delivered to one or more event targets by the event bus service in the primary region. The operations may include detecting a region change event for the event bus in the first region. After detection of the region change event, the operations may also include redirecting further events received via the network endpoint to an event bus in the secondary region, wherein the further events are delivered to the one or more event targets by the event bus service in the secondary region.

In one aspect, a system for simulating outages to manage secondary network scaling is described. The system may include one or more processors and a memory storing instructions that, when executed by on or across the one or more processors, cause the one or more processors to implement a control plane for a plurality of computing resources of a provider network, wherein the provider network is implemented across a plurality of regions. The control plane is configured to cause simulated outages of a primary region of the plurality of regions selected to host the plurality of different computing resources, wherein the simulated outages are caused at different periods of time, and wherein one or more secondary regions of the plurality of regions are selected to host the plurality of computing resources in the event of an outage of the primary region. During the simulated outages of the first network, the control plane is configured to move respective workloads of the plurality of different computing resources to be performed in the one or more secondary networks. During the simulated outages, the control plane is configured to track a performance of computing resources in the one or more secondary regions hosting the moved respective workloads of the plurality of computing resources. After completing individual ones of the simulated outages of the first network, the control plane may move the respective workloads of the plurality of different computing resources back to the primary region.

In another aspect, a method for replicating events is described. A method may include causing, by a control plane for a plurality of computing resources, simulated outages of a primary network of a plurality of networks selected to host the plurality of different computing resources, wherein the simulated outages are caused at different periods of time, and wherein one or more secondary networks of the plurality of networks are selected to host the plurality of computing resources in response to an outage of the primary network. The method may further include during the simulated outages of the first network, moving, by the control plane, respective workloads of the plurality of computing resources to be performed in the one or more secondary networks. The method may also include after completing individual ones of the simulated outages of the first network, moving, by the control plane, the respective workloads of the plurality of computing resources back to the primary network.

In yet another aspect, one or more computer-readable storage media are described. The storage media stores instructions that, when executed on or across one or more processors, cause the one or more processors to perform operations. The operations include causing simulated outages of a primary network of a plurality of networks selected to host a plurality of different computing resources, wherein the simulated outages are caused at different periods of time, and wherein one or more secondary networks of the plurality of networks are selected to host the plurality of computing resources in response to an outage of the primary network. The operations also include during the simulated outages of the first network, moving respective workloads of the plurality of computing resources to be performed in the one or more secondary networks. The operations may also include after completing individual ones of the simulated outages of the first network, moving the respective workloads of the plurality of computing resources back to the primary network.

In one aspect, a system for replicating events across a plurality of service regions is described. A system may implement an event bus service that hosts an event bus in respective ones of a plurality of regions. The event bus service is configured to receive, at the event bus in a secondary region of the plurality of regions, a replicated indication of an event that is replicated from the event bus in a primary region of the plurality of regions. The event bus service is also configured to determine, at the event bus in the secondary region, whether the primary region has completed processing of the event within a pre-determined time period based on a replication record for the event, wherein the replication record is accessible by the secondary region and the primary region. Based on a determination that the primary region has not completed processing of the event within the pre-determined time period, the event bus service is also configured to process the event according to the replicated indication and indicate, in the replication record, that the secondary region has completed processing of the event.

In another aspect, a method for replicating events across a plurality of service networks is described. The method may include receiving, at an event bus in a secondary network of a plurality of networks, a replicated instance of an event that is provided to an event bus in a primary network of the plurality of networks. The method may also include monitoring, at the event bus in the secondary network, a completion status for the event at the primary network based on a replication record for the event, wherein the replication record is accessible by the secondary network and the primary network. The method may further include based on the completion status, processing the event according to the replicated instance.

In yet another aspect, one or more computer-readable media storing instructions that, when executed on or across one or more processors, cause the one or more processors to implement an event bus. The event bus is configured to, in response to receiving a replicated instance of an event at a secondary network of a plurality of networks of a provider network, monitor a completion status for the event at a primary region of the plurality of networks based on a replication record for the event, wherein the replication record is accessible by the secondary network and the primary network. The event bus is configured to, based on the completion status, process the event according to the replicated instance.

FIG. 1 illustrates a block diagram of a system 100 configured to provide an event bus service implemented across a plurality of regions of a provider network, according to some embodiments. The plurality of regions may include at least a primary service region 120 and a secondary service region 130, in various embodiments. In some implementations, multiple event buses may be implemented across the plurality of regions. For example, a first event bus may be implemented in the primary service region 120, and a second event bus may be implemented in the secondary service region 130. In other embodiments, the plurality of regions may include additional service regions configured to be backups or alternatives to the primary service region 120. The secondary service region 130 may be one of many secondary service regions that are configured to process events.

The provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network via a publicly accessible network (e.g., the Internet, a cellular communication network). Regions are connected to a global network which includes private networking infrastructure (e.g., fiber connections controlled by the cloud provider) connecting each region to at least one other region. The provider network may deliver content from points of presence outside of, but networked with, these regions by way of edge locations and regional edge cache servers. An edge location can be an extension of the cloud provider network outside of the traditional region/AZ context. For example, an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network to provide low-latency resource access to customers on a global scale with a high degree of fault tolerance and stability. In some implementations, the primary service region 120 and the secondary service region 130 may be, for example, a primary data center and a secondary data center, respectively.

The event bus service may be implemented by one or more computing devices having respective processors and memories that implement instructions that cause the processors to perform computing operations. The event bus service may be configured to provide a network endpoint 110, according to some embodiments. The endpoint 110 may be configured to receive incoming events 104 from one or more event sources 102, according to some embodiments. For example, the one or more event sources 102 may include client devices. The client devices may include respective processors and memories that store instructions that cause the processors to perform computing operations, such as generating the events 104 and sending the events 104 to the endpoint 110.

The endpoint 110 may be configured to be a client-facing point-of-entry to an underlying service or system, according to some embodiments. For example, the underlying service may include a target service 142 implemented by an event target 140. In some embodiments, the endpoint 110 may be configured to receive events 104 from clients relating to the underlying services. For example, the events 104 may include database queries or write requests relating to data 144 stored in a database 142. In some embodiments, the event target 140 may be located within a network separate from the primary service region 120 or the secondary service region 130. In other embodiments, the event target 140 may be located within the primary service region 120 or the secondary service region 130.

The endpoint 110 may be configured to direct the incoming events 104 to the primary service region 120 as a default routing destination, according to some embodiments. For example, the endpoint 110 may initially be configured to prefer sending the events 104 to the primary service region 120 based on configuration from the clients, such as location information pertaining to the one or more event sources 102. In some embodiments, the secondary service region 130 may be configured as a backup service region for the primary service region 120. For example, the secondary service region 130 may be configured to implement one or more functions in place of the primary service region 120 based on a determination that the primary service region 120 has suffered an outage or disruption of service. In some embodiments, directing the events 104 to the primary service region 120 may include resolving a Domain Name System (DNS) address for the primary service region 120 and providing the DNS address of the primary service region 120 to endpoint 110 and/or the respective event source 102. For example, the endpoint 110 may provide the DNS address to the event source 102 to cause the event source 102 to put an event directly with the primary service region 120. In other embodiments, the endpoint 110 may direct the event to the primary service region 120 by passing the event through the endpoint 110 as an intermediary to the primary service region 120. In some embodiments, the endpoint 110 may include a DNS cache 117 configured to store DNS records for the primary service region 120, the secondary service region 130 and other service regions. In some embodiments, the secondary service region 130 may include additional secondary service regions as backup regions to the primary service region 120.

The endpoint 110 may include region selection logic 112 that may determine a service region to which the events 104 are directed, according to some embodiments. For example, the region selection logic 112 may be configured to determine whether a region change event has occurred. In some embodiments, the region change event may include failure of a given region to which the events 104 would have been initially directed. For example, the region change event may include a determination that the primary service region 120 has experienced a failure or an outage. In some embodiments, the determination as to whether the primary service region 120 has experienced failure may be based on performance information of the primary service region 120. For example, the performance information may be indicated as region health status information 118. In some embodiments, the region change event may be described as a network change event that may result in changing from one network to another network.

The primary service region 120 may include a health monitor 121 configured to generate at least a portion of the region health status information 118, according to some embodiments. For example, the health monitor 121 may be configured to record metrics relating to performance of various components or portions of the primary service region 120. The health monitor 121 may be configured to generate status reports indicating a current health status of the primary service region 120 or any components thereof. The status reports may be used to generate at least a portion of the region health status information 118 pertaining to the primary service region 120, according to some embodiments. In other embodiments, the health monitor 121 may be located outside of the primary service region 120 and the secondary service region 130 while having access to performance metrics of the primary service region 120 and the secondary service region 130.

The region selection logic 112 may be configured to determine whether a region change event or, alternatively, a network change event has occurred, according to some embodiments. For example, the region selection logic 112 may be configured to monitor the primary service region 120 to determine whether an outage has occurred at the primary service region 120 such that subsequent ones of the incoming events 104 should be directed to an alternative service region (e.g., the secondary service region 130) for continued processing of the events 104. As another example, the region change event may include a reduced workload throughput or an increased processing workload of the primary service region 120. In some embodiments, the region selection logic 112 may detect that a region change event has occurred based on comparing at least a portion of the region health status information 118 to respective threshold values. For example, the region selection logic 112 may compare a given metric in the region health status information 118 to a respective threshold value for the type of metric to determine whether a region change event has occurred.

Based on a determination that a region change event has not occurred or has not been detected, the endpoint 110 may be configured to continue sending the incoming events 104 to the primary service region 120, according to some embodiments. Based on a determination that the region change event has occurred or has been detected, the endpoint 110 may be configured to send at least a portion of the incoming events 104 to the secondary service region 130, according to some embodiments. In other embodiments, the endpoint 110 may be configured to send different portions of the incoming events 104 to different service regions to distribute the load of the events 104 across potentially smaller service regions than the primary service region 120 or across multiple service regions where no single service region has sufficient resources to handle the load of events. For example, the endpoint 110 may be configured to send a first portion of the incoming events 104 to the secondary service region 130 and to send a second portion of the incoming events 104 to a third service region.

The region selection logic 112 may be configured to utilize occasional or periodic testing to maintain server scaling in various regions, according to some embodiments. The testing may include chaos testing such that the endpoint 110 may simulate an outage of one or more service regions in order to redirect traffic from one service region to another service region. For example, the endpoint 110 may simulate an outage of the primary service region 120 to redirect at least a portion of the incoming events 104 to the secondary service region 130. In some situations, the simulated outages may occasionally divert traffic intended for the primary service region 120 to be directed to the secondary service region 130 or other backup service regions to maintain at least some utilization of the secondary service region 130 or other backup service regions. The diverted or redirected traffic may also cause the secondary service region 130 or other backup service regions to scale computing resources in response to the increased traffic or workload throughput applied by the endpoint 110. By improving scalability of the secondary service region 130 or other backup service regions, the secondary service region 130 or other backup service regions may be better prepared to scale in the event of an actual outage of the primary service region 120.

The region selection logic 112 may be configured to simulate an outage of the primary service region 120 to redirect traffic of the incoming events 104 to a backup service region, according to some embodiments. For example, the region selection logic 112 may perform actions as if the primary service region 120 is having a service outage even if the region health status information 118 indicates that the primary service region 120 is healthy. As another example, the region selection logic 112 may be configured to disregard the region health status information 118 during a simulated outage and automatically select the secondary service region 130 as the backup service region.

The simulated outages may be implemented in a manner that is at least partially scheduled, according to some embodiments. In some embodiments, the region selection logic 112 may simulate an outage based on a simulated outage interval 114. For example, the region selection logic 112 may be configured to simulate an outage when a time period for the simulated outage interval 114 elapses. As another example, the region selection logic 112 may be configured to simulate an outage a time period elapses that is at least a duration of the simulated outage interval 114. As an illustrative example, suppose the simulated outage interval 114 is set to be four (4) hours. The region selection logic 112 may simulate an outage when at least four hours have elapsed. In some situations, the region selection logic 112 may have an upper limit to the duration between simulated outages such that simulated outages occur after the simulated outage interval 114 elapses but before the upper limit elapses to ensure that simulated outages regularly occur.

The region selection logic 112 may be configured to limit how long a simulated outage is maintained, according to some embodiments. For example, the region selection logic 112 may constrain or limit a simulated outage to a simulated outage duration 116. In some embodiments, the simulated outage duration 116 may be set to a lower duration of time than the simulated outage interval 114. As an illustrative example, the simulated outage interval 114 may be set to a period of four hours, and the simulated outage duration 116 may be set to a period of ten (10) minutes. In this example, a simulated outage may occur for ten minutes every four hours such that most of the incoming events 104 are provided to the primary service region 120 unless there is an actual outage of the primary service region 120. Other values for the simulated outage interval 114 and the simulated outage duration 116 may be configured by the provider network or the client.

The region selection logic 112 may temporarily refrain from simulating outages while one or more of the primary service region 120 or the secondary service region 130 incur an actual outage, according to some embodiments. For example, based on the region health status information 118, the region selection logic 112 may determine that the secondary service region 130 may be having an outage at a current time such that the endpoint 110 should not be intentionally directing traffic to the secondary service region 130 resulting from a simulated outage of the primary service region 120. In some embodiments, the region selection logic 112 may also disable simulation of outages while the primary service region 120 is having an outage. For example, the region selection logic 112 may select the secondary service region 130 as a routing target in response to the outage of the primary service region 120 such that no additional simulations of outages are necessary or required to continue directing traffic to the secondary service region 130. In some embodiments, the region selection logic 112 may disable simulation of outages while the secondary service region 130 is having an outage. For example, the region selection logic 112 may refrain from intentionally directing any traffic to the secondary service region 130 while there is an outage at the secondary service region 130.

A given event source 102 providing the events 104, such as the client, may opt-out of simulated outages at least for a limited duration of time, according to some embodiments. For example, the client may indicate to the endpoint 110 that the events 104 originating from the client should not be subject to simulated outages by the region selection logic 112. As another example, the client may send a request to the endpoint that the events 104 originating from the client should be preferably not subject to the simulated outages. In some embodiments, the client may be provisioned as a permanent exception to the simulated outages as part of an onboarding process with the provider network. For example, the endpoint 110 may include a record that indicates that the client is specifically exempted from the simulated outages and always given priority to the best available service region, such as the primary service region 120. In some situations, the client may request to be exempted from simulated outages that would otherwise result in being sent to a particular service region. For example, a client may request to be exempted from simulated outages that would otherwise direct traffic of the events 104 to the secondary service region 130. The client may request exemptions based on restrictions that may apply to the client or an application, such as legal restrictions or geographical restrictions that would prevent or limit execution of events in the secondary service region 130. The exemptions may also apply to prevent workload redistribution when the primary service region 120 has suffered an actual outage.

The primary service region 120 and the secondary service region 130 may respectively include various components to implement one or more aspects of the event bus service, according to some embodiments. In some embodiments, the primary service region 120 may include one or more computing devices comprising respective processors and memories that cause the processors to perform operations for various components of the event bus service. For example, the primary service region 120 may include the health monitor 121, an event bus 122, an event reader 124, a message queue 125, one or more endpoint records 126, and an event worker 128.

The event bus 122 may be configured to receive at least a portion of the events 104 via the endpoint 110, according to some embodiments. For example, the endpoint 110 may direct or send at least a portion of the events 104 to the primary service region 120 via the event bus 122 as an ingress point. In some embodiments, the event bus 122 may maintain workloads from the inbound events. For example, the event bus 122 may be configured to provide the inbound events to other computing resources in the primary service region 120, such as the event reader 124. In some embodiments, the event reader 124 may be configured to read events as provided by the event bus 122. For example, the event bus 122 may control a rate limit of incoming events to not overwhelm the system. In some embodiments, the event reader 124 may be configured to determine what computing resources may be required to process a given event. For example, the event reader 124 may be configured to determine whether the given event may be sent to a given message queue, such as the message queue 125, for downstream processing. The message queue 125 may be configured to maintain and order of the events in the primary service region 120 for downstream processing, according to some embodiments. For example, the message queue 125 may control which events get pushed to a subsequent component, such as the event worker 128, for downstream processing of the events.

The endpoint records 126 may include information describing the endpoint 110, additional endpoints, and information describing the regions implemented as part of the provider network, according to some embodiments. For example, the endpoint records 126 may store information indicating that the secondary service region 130 is a backup region for the primary region 120. As another example, the endpoint records 126 may indicate that the endpoint 110 is configured to route events 104 to the primary service region 120.

The event worker 128 may be configured to process the events in the primary service region 120, according to some embodiments. For example, the event worker 128 may be configured to send events from the primary service region 120 to the one or more event targets 140. In some embodiments, the event targets 140 may include one or more computing resources configured to provide a respective target service 142. As an illustrative example, the target service 142 may include a database service that performs actions as indicated in the events 104. The events 104 may include data operations, such as reading or writing data, to a database managed by the database service. In some embodiments, the event worker 128 may be configured to write to logs for the events that may be replayed in a different region. For example, the event worker 128 may be configured to record the logs such that the event worker 138 may process the events according to the recorded logs.

In some embodiments, the secondary service region 130 may be configured as a backup region to the primary service region 120. In other embodiments, the secondary service region 130 may be configured as an alternative region that is geographically located in a different location than the primary service region 120. In some embodiments, the secondary service region 130 may have a configuration similar to the primary service region 120. In other embodiments, the secondary service region 130 may include fewer computing resources to be configured as a dedicated backup to the primary service region 120.

The secondary service region 130 may include one or more computing devices comprising respective processors and memories that cause the processors to perform operations for various components of the event bus service. For example, the primary service region 130 may include the health monitor 131, an event bus 132, an event reader 134, a message queue 135, one or more endpoint records 136, and an event worker 138.

The event bus 132 may be configured to receive at least a portion of the events 104 via the endpoint 110, according to some embodiments. For example, the endpoint 110 may direct or send at least a portion of the events 104 to the secondary service region 130 via the event bus 132 as an ingress point. In some embodiments, the event bus 132 may maintain workloads from the inbound events. For example, the event bus 132 may be configured to provide the inbound events to other computing resources in the secondary service region 130, such as the event reader 134. In some embodiments, the event reader 134 may be configured to read events as provided by the event bus 132. For example, the event bus 132 may control a rate limit of incoming events to not overwhelm the system. In some embodiments, the event reader 134 may be configured to determine what computing resources may be required to process a given event. For example, the event reader 134 may be configured to determine whether the given event may be sent to a given message queue, such as the message queue 135, for downstream processing. The message queue 135 may be configured to maintain and order of the events in the secondary service region 130 for downstream processing, according to some embodiments. For example, the message queue 135 may control which events get pushed to a subsequent component, such as the event worker 138, for downstream processing of the events.

The endpoint records 136 may include information describing the endpoint 110, additional endpoints, and information describing the regions implemented as part of the provider network, according to some embodiments. For example, the endpoint records 136 may store information indicating that the secondary service region 130 is a backup region for the secondary region 130. As another example, the endpoint records 136 may indicate that the endpoint 110 is configured to route events 104 to the secondary service region 130.

The event worker 138 may be configured to process the events in the secondary service region 130, according to some embodiments. For example, the event worker 138 may be configured to send events from the secondary service region 130 to the one or more event targets 140.

Figure 2:
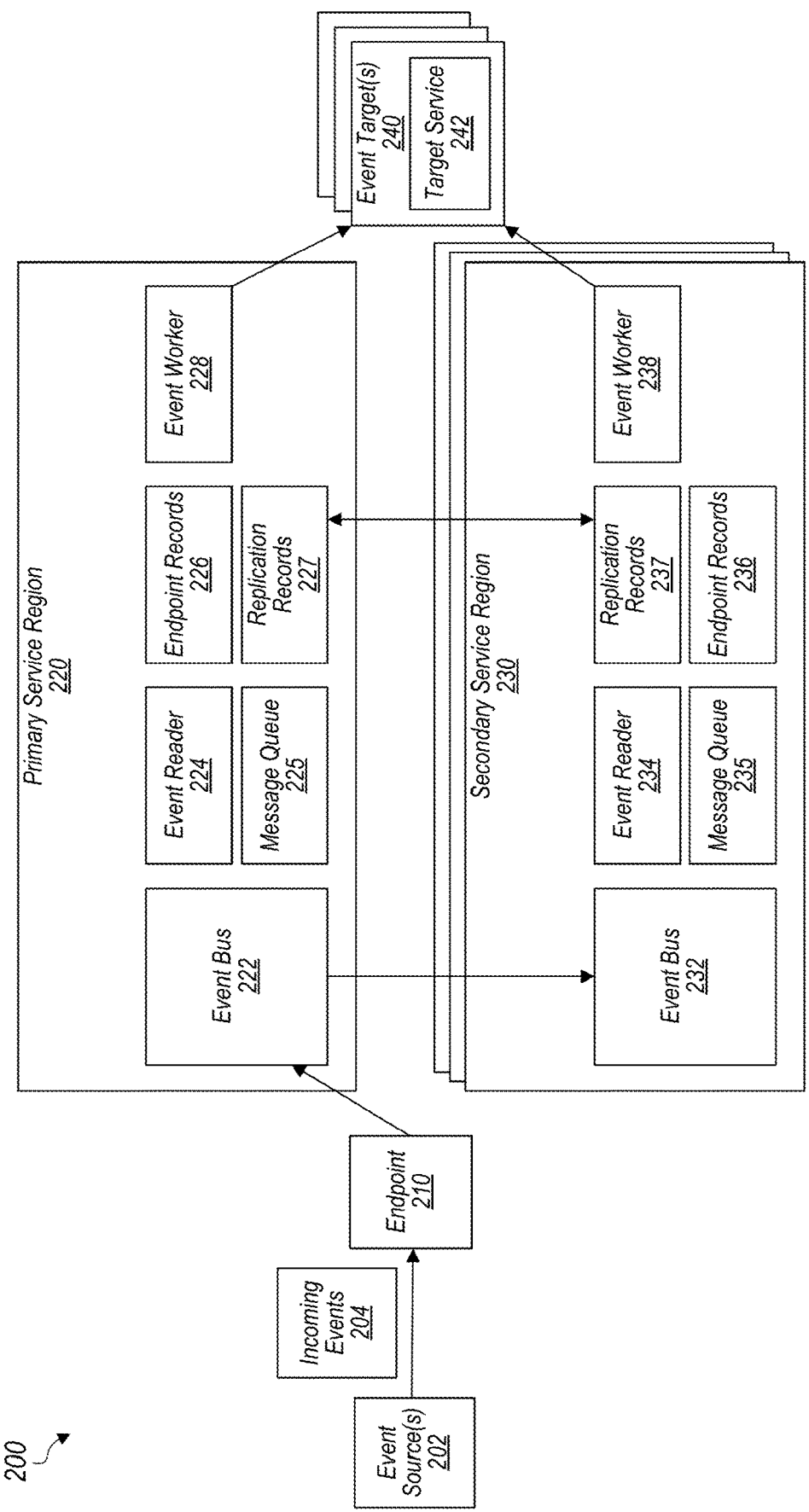
FIG. 2 illustrates a block diagram for a system configured to provide an event bus service implemented across a plurality of regions of a provider network, according to some embodiments.

FIG. 2 illustrates a block diagram for a system 200 configured to provide an event bus service implemented across a plurality of regions of a provider network, according to some embodiments. The plurality of regions may include at least a primary service region 220 and a secondary service region 230, according to some embodiments. The event bus service may be configured to replicate events across the plurality of regions. In some embodiments, the replicated events may allow a backup region to be prepared to process the events in response to a failure of the primary service region 220.

In some embodiments, at least some of the plurality of regions may be configured as backup regions for other regions. For example, the secondary service region 130 may be configured as a backup region for the primary service region 120. The secondary service region 130 may be configured to process events 104 based on a determination that the primary service region 120 was not able to process the events 104 in a timely manner.

The event bus service may be configured to provide an endpoint 210 configured to receive incoming events 204 from one or more event sources 202, according to some embodiments. The endpoint 210 may be configured to direct the events 204 to an event bus 222 in the primary service region 220. In some embodiments, directing the events 204 to the primary service region 220 may include resolving a Domain Name System (DNS) address for the primary service region 220 and providing the DNS address of the primary service region 220 to endpoint 210 and/or the respective event source 202. For example, the endpoint 210 may provide the DNS address to the event source 202 to cause the event source 202 to put an event directly with the primary service region 220. In other embodiments, the endpoint 210 may direct the event to the primary service region 220 by passing the event through the endpoint 210 as an intermediary to the primary service region 220. In some embodiments, the endpoint 210 may include a DNS cache configured to store DNS records for the primary service region 220, the secondary service region 230 and other service regions.

The primary service region 220 and the secondary service region 230 may respectively include various components to implement one or more aspects of the event bus service, according to some embodiments. In some embodiments, the primary service region 220 may include one or more computing devices comprising respective processors and memories that cause the processors to perform operations for various components of the event bus service. For example, the primary service region 220 may include the health monitor 221, an event bus 222, an event reader 224, a message queue 225, one or more endpoint records 226, and an event worker 228.

The event bus 222 may be configured to receive at least a portion of the events 204 via the endpoint 210, according to some embodiments. For example, the endpoint 210 may direct or send at least a portion of the events 204 to the primary service region 220 via the event bus 222 as an ingress point. In some embodiments, the event bus 222 may maintain workloads from the inbound events. For example, the event bus 222 may be configured to provide the inbound events to other computing resources in the primary service region 220, such as the event reader 224. In some embodiments, the event reader 224 may be configured to read events as provided by the event bus 222. For example, the event bus 222 may control a rate limit of incoming events to not overwhelm the system. In some embodiments, the event reader 224 may be configured to determine what computing resources may be required to process a given event. For example, the event reader 224 may be configured to determine whether the given event may be sent to a given message queue, such as the message queue 225, for downstream processing. The message queue 225 may be configured to maintain and order of the events in the primary service region 220 for downstream processing, according to some embodiments. For example, the message queue 225 may control which events get pushed to a subsequent component, such as the event worker 228, for downstream processing of the events.

The endpoint records 226 may include information describing the endpoint 210, additional endpoints, and information describing the regions implemented as part of the provider network, according to some embodiments. For example, the endpoint records 226 may store information indicating that the secondary service region 230 is a backup region for the primary region 220. As another example, the endpoint records 226 may indicate that the endpoint 210 is configured to route events 204 to the primary service region 220.

In some embodiments, the secondary service region 230 may be configured as a backup region to the primary service region 220. In other embodiments, the secondary service region 230 may be configured as an alternative region that is geographically located in a different location than the primary service region 220. In some embodiments, the secondary service region 230 may have a configuration similar to the primary service region 220. In other embodiments, the secondary service region 230 may include fewer computing resources to be configured as a dedicated backup to the primary service region 220.

The secondary service region 230 may include one or more computing devices comprising respective processors and memories that cause the processors to perform operations for various components of the event bus service. For example, the primary service region 230 may include the health monitor 231, an event bus 232, an event reader 234, a message queue 235, one or more endpoint records 236, and an event worker 238.

The event bus 232 may be configured to receive at least a portion of the events 204 via the endpoint 210, according to some embodiments. For example, the endpoint 210 may direct or send at least a portion of the events 204 to the secondary service region 230 via the event bus 232 as an ingress point. In some embodiments, the event bus 232 may maintain workloads from the inbound events. For example, the event bus 232 may be configured to provide the inbound events to other computing resources in the secondary service region 230, such as the event reader 234. In some embodiments, the event reader 234 may be configured to read events as provided by the event bus 232. For example, the event bus 232 may control a rate limit of incoming events to not overwhelm the system. In some embodiments, the event reader 234 may be configured to determine what computing resources may be required to process a given event. For example, the event reader 234 may be configured to determine whether the given event may be sent to a given message queue, such as the message queue 235, for downstream processing. The message queue 235 may be configured to maintain and order of the events in the secondary service region 230 for downstream processing, according to some embodiments. For example, the message queue 235 may control which events get pushed to a subsequent component, such as the event worker 238, for downstream processing of the events.

The secondary service region 230 may be configured to maintain information regarding events that are processed by the secondary service region 230 while the primary service region 220 experiences a failure, according to some embodiments. For example, the secondary service region 230 may maintain a log for events processed by the secondary service region 230 that may be synchronized with the primary service region 220 when the primary service region 220 returns online. The log may be sent to the primary service region 220 such that the primary service region 220 may be updated upon recovery from the outage of the primary service region 220. In another example, the events may be persisted or cached in the secondary service region 230 until the primary service region 220 is able to accept events again. In embodiments having multiple backup service regions, the backup service regions may each receive replicated instances of the events such that all backup service regions may fulfill events in response to a determination that multiple regions experience simultaneous failures.

The endpoint records 236 may include information describing the endpoint 210, additional endpoints, and information describing the regions implemented as part of the provider network, according to some embodiments. For example, the endpoint records 236 may store information indicating that the secondary service region 230 is a backup region for the secondary region 230. As another example, the endpoint records 236 may indicate that the endpoint 210 is configured to route events 204 to the secondary service region 230.

The event bus 222 may be configured to replicate the events 204 to a backup region, according to some embodiments. For example, the event bus 222 may be configured to replicate the events 204 to the secondary service region 230. In some embodiments, replication the events 204 may include sending a replicated instance of a given event to an event bus 232 of the secondary service region 230. For example, the event bus 222 may duplicate an instance of the event in order to generate the replated instance of the event to be directed to the event bus 232. In other embodiments, the endpoint 210 may be configured to send respective instances of the events 204 to any or all of the service regions configured to process the events 204. For example, the endpoint 210 may be configured to send respective instances of the events 204 to at least both the event bus 222 and the event bus 232. In some embodiments, replicated instances of the events 204 may include information that indicates that the event was replicated. The replicated instances of the events 204 may also include information indicating a time period in which the primary service region 220 may be allowed to attempt processing of the events 204. For example, the time period may be a pre-determined duration of time in which the primary service region 220 may attempt processing of the events 204. After the time period elapses, a backup region, such as the secondary service region 230 may attempt processing of the events 204.

In some embodiments, the event bus 222 may generate one or more replication records 227 indicating respective ones of the events 204 and respective statuses of processing the events 204. For example, the replication records 227 for a given event may include an indication of the given event, a current status of the event (e.g., whether processing of the event has been completed and by which region), and a time to live (TTL) or time limit for processing of the event at the primary service region 220. The TTL may represent a pre-determined time period in which backup regions may be required to wait until the backup regions may attempt to process the event based on determining that the primary service region 220 has failed or was unable to complete processing of the event during the time period. In some embodiments, the replication records 227 may be stored in a database table hosted in the primary service region 220.

The replication records 227 may be synchronized with replication records 237 in the secondary service region 230, according to some embodiments. For example, the replication records 227 may be sent to the secondary service region 230 to be maintained as the replication records 237. In other embodiments, the secondary service region 230 may be configured to retrieve the replication records 227 from the primary service region 220. For example, the secondary service region 230 may be configured to retrieve the replication records 227 in response to the event bus 232 receiving the replicated indications of the events 204. As another example, the secondary service region 230 may access or retrieve the replication records 227 as events in the message queue 235 are being processed by the secondary service region 230.

The event worker 228 may be configured to process the events in the primary service region 220, according to some embodiments. For example, the event worker 228 may be configured to send events from the primary service region 220 to the one or more event targets 240. In some embodiments, the event targets 240 may include one or more computing resources configured to provide a respective target service 242. As an illustrative example, the target service 242 may include a database service that performs actions as indicated in the events 204. The events 204 may include data operations, such as reading or writing data, to a database managed by the database service.

For individual events of the events 204, the event worker 228 may attempt to process each of the events within respective time limits for competing processing. If the event worker 228 completes processing of a given event and sends the event to the respective event target within the respective time limit, the replication record 227 for the event may be updated to indicate that the primary service region 220 has completed processing the event. If the event worker 228 is unable to complete processing of the event within the time limit, the replication record 227 for the event may remain unchanged or be modified to indicate that the primary service region 220 was unable to complete processing the event.

The event worker 238 may be configured to process the events in the secondary service region 230 based on a determination that the primary service region 220 was not able to complete processing of the events within respective time limits for completing processing, according to some embodiments. For example, the event worker 238 may be configured to analyze the replication record 227 for a given event to determine whether the primary service region 210 or any other service region has completed processing of the event. As another example, the event worker 238 may be configured to analyze the replication record 237 that is based on the replication record 227 to determine whether the primary service region 210 or any other service region has completed processing of the event.

Analysis of the replication record 227 or the replication record 237 may include determining whether at least one of the replication record 227 or the replication record 237 includes information indicating a completion status for the event, according to some embodiments. For example, the event worker 238 may be configured to analyze the replication record 227 or the replication record 237 to look for information indicating a completion status for processing the event by the primary service region 210. Based on a determination that the event was not processed by the primary service region 210 within the time limit, the event worker 238 may proceed to process the event. For example, the event worker 238 may be configured to send events from the secondary service region 230 to the one or more event targets 240.

Figure 3:
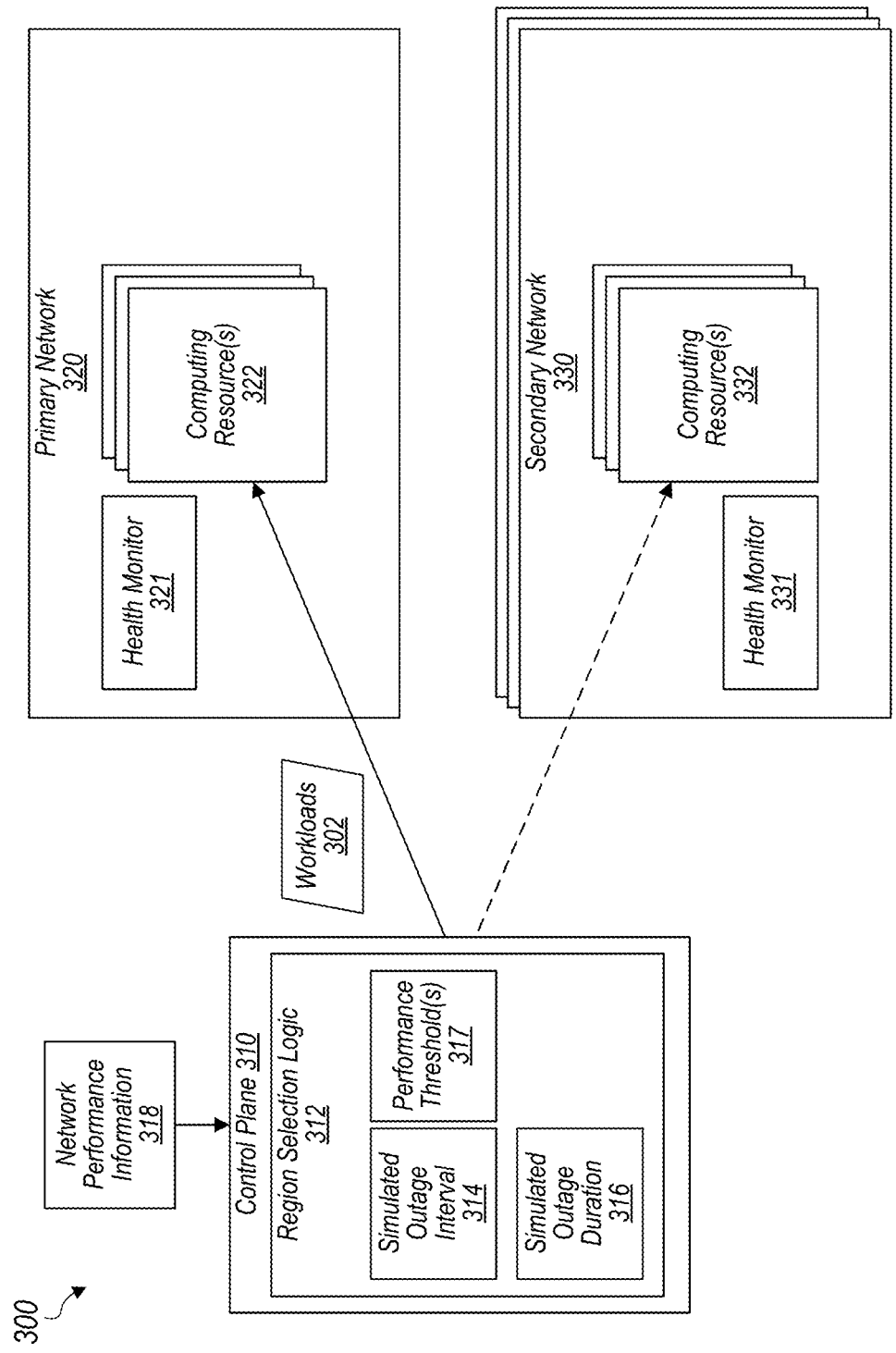
FIG. 3 illustrates a block diagram for a system configured to cause simulated outages to balance network resources, according to some embodiments.

FIG. 3 illustrates a block diagram for a system 300 that includes a control plane 310, a primary network 320, and a secondary network 330, according to some embodiments. The primary network 320 and the secondary network 330 may collectively form a plurality of networks configured to perform various computing tasks with one or more computing resources, such as computing resources 322 and computing resources 332.

The primary network 320 may be initially selected to execute workloads 304 in the computing resources 322 hosted by the primary network 320, according to some embodiments. The secondary network 330 may be initially designated as a backup network or alternative network for the executing the workloads 304 in the event that the primary network 320 has an outage or is unavailable for executing the workloads 304.

The control plane 310 may be configured to route workloads 302 to the primary network 320 or the secondary network 330 based on various criteria, according to some embodiments. The control plane 310 may include network selection logic 312 configured to select the primary network 320 or the secondary network 330 as a routing target for the workloads 302. In some embodiments, the primary network 320 may be a preferred network for the workloads 302. For example, the control plane 310 may direct the workloads to the primary network 320 while the primary network 320 is active and not restricted due to other circumstances such an outage. In some embodiments, the control plane 310 may determine whether the primary network 320 has an outage based on network performance information 318. In some embodiments, the primary network 320 may include a health monitor 321 configured to record and collect performance information relating to the computing resources 322 and the primary network 320 as a whole.

The network selection logic 312 may be configured to move the workloads 304 from the primary network 320 to the secondary network 330 based on a determination that the network performance information 318 indicating that the primary network 320 has an outage or is unhealthy, according to some embodiments. For example, the health monitor 321 may provide health metrics or performance information as the network performance information 318 to the control plane 310. In some embodiments, region selection logic 312 may detect an outage or an unhealthy state based on one or more performance thresholds 317. For example, the performance thresholds 317 may be compared to one or more metrics in the network performance information 318 such that when a given metric does not satisfy a respective threshold, the primary network 320 may be determined to have an outage or be unhealthy.

Based on detecting an outage or an unhealthy state of the primary network 320, the control plane 310 may redirect at least a portion of the workloads 302 to the secondary network 330, according to some embodiments. For example, the control plane 310 may divert any unfulfilled workloads of the workloads 302 from the computing resources 322 to the computing resources 332. As another example, the control plane 310 may redirect subsequent workloads of the workloads 302 to the secondary network 330 for processing.

The network selection logic 312 may be configured to utilize occasional or periodic testing to maintain server scaling in various regions, according to some embodiments. The testing may include chaos testing such that the endpoint 310 may simulate an outage of one or more networks in order to redirect traffic from one network to another network. For example, the endpoint 310 may simulate an outage of the primary network 320 to redirect at least a portion of the workloads 302 to the secondary network 330. In some situations, the simulated outages may occasionally divert traffic intended for the primary network 320 to be directed to the secondary network 330 or other backup networks to maintain at least some utilization of the secondary network 330 or other backup networks. The diverted or redirected traffic may also cause the secondary network 330 or other backup networks to scale computing resources in response to the increased traffic or workload throughput applied by the endpoint 310. By improving scalability of the secondary network 330 or other backup networks, the secondary network 330 or other backup networks may be better prepared to scale in the event of an actual outage of the primary network 320.

The network selection logic 312 may be configured to simulate an outage of the primary network 320 to redirect traffic of the workloads 302 to a backup network, according to some embodiments. For example, the network selection logic 312 may perform actions as if the primary network 320 is having a service outage even if the region health status information 318 indicates that the primary network 320 is healthy. As another example, the network selection logic 312 may be configured to disregard the region health status information 318 during a simulated outage and automatically select the secondary network 330 as the backup network.

The simulated outages may be implemented in a manner that is at least partially scheduled, according to some embodiments. In some embodiments, the network selection logic 312 may simulate an outage based on a simulated outage interval 314. For example, the network selection logic 312 may be configured to simulate an outage when a time period for the simulated outage interval 314 elapses. As another example, the network selection logic 312 may be configured to simulate an outage a time period elapses that is at least a duration of the simulated outage interval 314. As an illustrative example, suppose the simulated outage interval 314 is set to be four (4) hours. The network selection logic 312 may simulate an outage when at least four hours have elapsed. In some situations, the network selection logic 312 may have an upper limit to the duration between simulated outages such that simulated outages occur after the simulated outage interval 314 elapses but before the upper limit elapses to ensure that simulated outages regularly occur.

The network selection logic 312 may be configured to limit how long a simulated outage is maintained, according to some embodiments. For example, the network selection logic 312 may constrain or limit a simulated outage to a simulated outage duration 316. In some embodiments, the simulated outage duration 316 may be set to a lower duration of time than the simulated outage interval 314. As an illustrative example, the simulated outage interval 314 may be set to a period of four hours, and the simulated outage duration 316 may be set to a period of ten (10) minutes. In this example, a simulated outage may occur for ten minutes every four hours such that most of the workloads 302 are provided to the primary network 320 unless there is an actual outage of the primary network 320. Other values for the simulated outage interval 314 and the simulated outage duration 316 may be configured by the provider network or the client.

The network selection logic 312 may temporarily refrain from simulating outages while one or more of the primary network 320 or the secondary network 330 incur an actual outage, according to some embodiments. For example, based on the region health status information 318, the network selection logic 312 may determine that the secondary network 330 may be having an outage at a current time such that the endpoint 310 should not be intentionally directing traffic to the secondary network 330 resulting from a simulated outage of the primary network 320. In some embodiments, the network selection logic 312 may also disable simulation of outages while the primary network 320 is having an outage. For example, the network selection logic 312 may select the secondary network 330 as a routing target in response to the outage of the primary network 320 such that no additional simulations of outages are necessary or required to continue directing traffic to the secondary network 330. In some embodiments, the network selection logic 312 may disable simulation of outages while the secondary network 330 is having an outage. For example, the network selection logic 312 may refrain from intentionally directing any traffic to the secondary network 330 while there is an outage at the secondary network 330. In some embodiments, the outage may be determined from the network performance information 318 pertaining to the secondary network 330 as provided by a health monitor 331.

Figure 4:
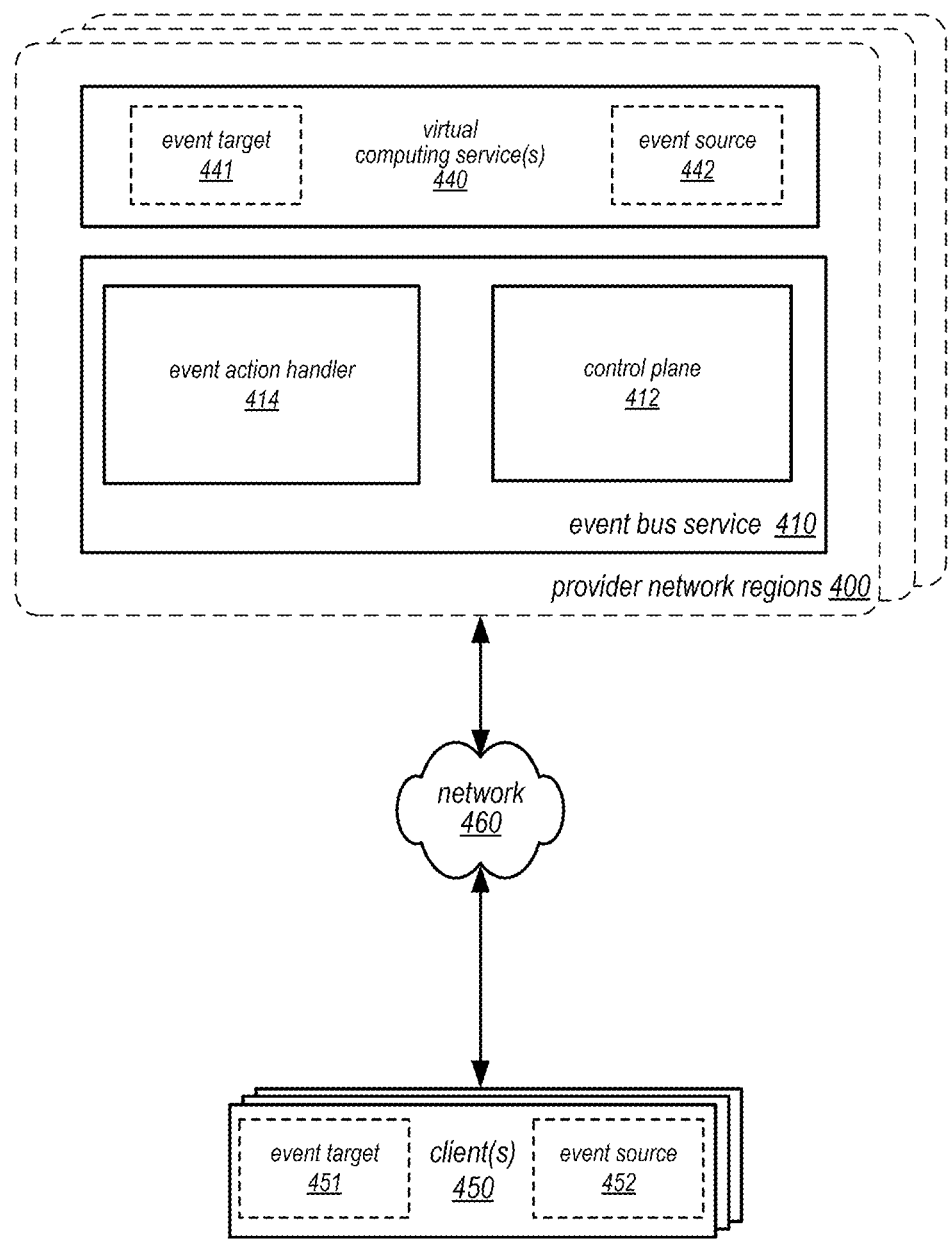
FIG. 4 is a logical block diagram illustrating a provider network that implements an event bus service restricting events to select regions, according to some embodiments.

FIG. 4 is a logical block diagram illustrating a provider network that implements an event bus service restricting events to select regions, according to some embodiments. A provider network may be a private or closed system or may be set up by an entity such as a company or a public sector organization to provide one or more services (such as various types of virtual computing services) accessible via the Internet and/or other networks to clients 450, which may be in one or more regions and may also function as an event target 451 and/or an event source 452. The clients 450 may be located in a single location or implemented over multiple network regions in some embodiments. The provider network also may be implemented in a single location or implemented over multiple network regions 400, that may include one or more data centers hosting various resource pools, such as collections of physical and/or virtualized computer servers, storage devices, networking equipment and the like (e.g., computing system 1000 described below with regard to FIG. 10, needed to implement and operate the event bus service 410 (including the region selection service 420) and one or more virtual computing services 440 and storage services offered by the provider network within the provider network regions 400. The provider network provisions and patches the one or more data centers hosting various resource pools to allow automatic scaling and built-in high availability.

A number of clients 450 may interact with provider network regions 400 via a network 460 across multiple network regions or various geographical groupings, in some embodiments. The client may be an event source 452 wherein the event source generates events to be transmitted to the event bus service 410. The client may likewise be an event target 451 wherein the event source receives events transmitted by the event bus service 410. The event source 452 may generate events with additional event-level policies to give the event bus service granular control, such as the policies to restrict the events to certain regions. Provider network regions 400 may implement an event bus service 410, region selection service 420, and/or virtual computing services 440 in respective regions. It is noted that where one or more instances of a given component may exist, reference to that component herein may be made in either the singular or the plural. However, usage of either form is not intended to preclude the other.

In various embodiments, the components illustrated in FIG. 4 may be implemented directly within computer hardware, as instructions directly or indirectly executable by computer hardware (e.g., a microprocessor or computer system), or using a combination of these techniques. Generally speaking, client(s) 450 may encompass any type of clients that can submit network-based services requests to provider network regions 400 via network 460, including requests for event bus services. For example, a given client 450 may include a suitable version of a web browser or may include a plug-in module or other type of code module may execute as an extension to or within an execution environment provided by a web browser. Alternatively, a client 450 may encompass an application such as a database application (or user interface thereof), a media application, an office application or any other application that may make use of the event bus service 410 to send events to make available to the virtual computing services for consumption, receive events from event bus service 410, and/or specify rules for events, in some embodiments. In some embodiments, event bus-level policies (or other system-level policies) may further be made available to the event bus service 410. In some embodiments, such an application may include sufficient protocol support (e.g., for a suitable version of HTTP) for generating and processing network-based services requests without necessarily implementing full browser support for all types of network-based data. That is, client 450 may be an application may interact directly with the event bus service 410 of various provider network regions 400. In some embodiments, client 450 may generate network-based services requests according to a Representational State Transfer (REST)-style web services architecture, a document-based or message-based network-based services architecture, or another suitable network-based services architecture.

Although client(s) 450 are illustrated as external to provider network regions 400, in some embodiments, clients may be implemented with provider network regions 400, such as applications or systems implemented on other virtual computing resources that may make use of event bus service 410 in various regions. In some embodiments, clients 450 may convey network-based services requests to and receive responses from provider network 400 via network 460. In various embodiments, network 460 may encompass any suitable combination of networking hardware and protocols necessary to establish network-based communications between clients 450 and provider network 400. For example, provider network regions 400 may generally encompass the various telecommunications networks and service providers that collectively implement the Internet. Network 460 may also include private networks such as local area networks (LANs) or wide area networks (WANs) as well as public or private wireless networks. For example, both a given client 450 and provider network regions 400 may be respectively provisioned within enterprises having their own internal networks. In such an embodiment, network 460 may include the hardware (e.g., modems, routers, switches, load balancers, proxy servers, etc.) and software (e.g., protocol stacks, accounting software, firewall/security software, etc.) necessary to establish a networking link between given client 450 and the Internet as well as between the Internet and network-based event bus service. It is noted that in some embodiments, clients 450 may communicate with provider network regions 400 using a private network rather than the public Internet. For example, clients 450 may be provisioned within the same enterprise as the event bus service 410. In such a case, clients 450 may communicate with platform regions 400 entirely through a virtual private network 460 (e.g., a LAN or WAN that may use Internet-based communication protocols, but which is not publicly accessible).

Generally speaking, provider network regions 400 may implement one or more service endpoints that may receive and process network-based services requests, such as the receipt of various events and receipt of rules for handling the events. For example, provider network regions 400 may include hardware and/or software may implement a particular endpoint, such that an HTTP-based network-based services request directed to that endpoint is properly received and processed. In one embodiment, provider network regions 400 may be implemented as a server system may receive network-based services requests from clients 450 and to forward them to components of a system that implements event bus service 410 and/or region selection service 420 for processing. In other embodiments, provider network regions 400 may be implemented as a number of distinct systems (e.g., in a cluster topology) implementing load balancing and other request management features may dynamically manage large-scale network-based services request processing loads. In various embodiments, provider network regions 400 may be may support REST-style or document-based (e.g., SOAP-based) types of network-based services requests.

In some embodiments, provider network regions 400 may implement various client management features. For example, provider network regions 400 may coordinate the receiving of events from the clients and the various event policies contained therein. Provider network regions 400 may also implement financial accounting and billing systems or may maintain a database of usage data that may be queried and processed by external systems for reporting and billing of client usage activity. In certain embodiments, provider network regions 400 may collect, monitor and/or aggregate a variety of storage service system operational metrics, such as metrics reflecting the rates and types of requests received from clients 450, bandwidth utilized by such requests, system processing latency for such requests, system component utilization (e.g., network bandwidth and/or storage utilization within the storage service system), rates and types of errors resulting from requests, characteristics of stored and requested data pages or records thereof (e.g., size, data type, etc.), or any other suitable metrics. In some embodiments, such metrics may be used by system administrators to tune and maintain system components, while in other embodiments such metrics (or relevant portions of such metrics) may be exposed to clients 450 to enable such clients to monitor their usage of event bus service 410 or virtual computing service(s) 440 (or the underlying systems that implement those services such as region selection service 420). In some embodiments, the one or more virtual computing services 440 may furthermore be an event target 441 or an event source 442. The respective event target 441 of the virtual computing services 440 may interact with the event bus service 410 to receive events from respective event source 452 of clients 450 in various regions as well as from event source 441 in a different provider network region. In other embodiments the respective event source 442 of the virtual computing services 440 may interact with the event bus service 410 to send events to respective event target 451 of clients 450 in various regions as well as to event target 441 in a different provider network region.

In some embodiments, event bus service 410 may route events received from event sources to one or more event targets according to various rules, which may be specified via an interface for event bus service 410. The traffic and operations of event bus service 410 may broadly be subdivided into two categories in various embodiments: control plane operations carried over a logical control plane and data plane operations carried over a logical data plane Event bus service 410 may implement event action handler 414, which may act as a data plane for event bus service 410. For example, while the data plane represents the movement of event data through event bus service 410 to an event target, the control plane 412 represents the movement of control signals through event bus service 410. The control plane generally includes one or more control plane components distributed across and implemented by one or more control servers. Control plane traffic generally includes administrative operations, such as system configuration and management (e.g., resource placement, hardware capacity management, diagnostic monitoring, system state information). Data plane traffic generally includes non-administrative operations such as routing of event data. Certain control plane 412 components (e.g., tier one control plane components such as the control plane for event bus service 410) may be implemented on a separate set of servers from the data plane servers, while other control plane 412 components (e.g., tier two control plane components such as analytics services) may share the virtualized servers with the data plane, and control plane 412 traffic and data plane traffic may be sent over separate/distinct networks.

In some embodiments, event bus service 410 may implement user authentication and access control procedures as part of control plane 412. For example, control plane 412 may determine whether a request is authorized to configure event policy/event bus policy interactions, publish event bus policies, publish events, specify rules, and/or receive events from event bus service 410. The control plane 412 may determine such authorization by, for example, evaluating an identity, password or other credential against credentials associated with a particular event source requesting the event bus service 410 to ingest an event data. For example, if a client 450 does not have sufficient credentials to publish events to the event bus service 410, the proxy node may reject the corresponding network-based services request, for example by returning a response to the requesting client 450 indicating an error condition. Various access control policies may be stored as records or lists of access control information by event bus service 410 and the virtual computing services 440. In some cases, the accounting and/or credentialing services of provider network regions 400 may be unnecessary for internal clients such as administrative clients or between service components within the same enterprise.

Figure 5:
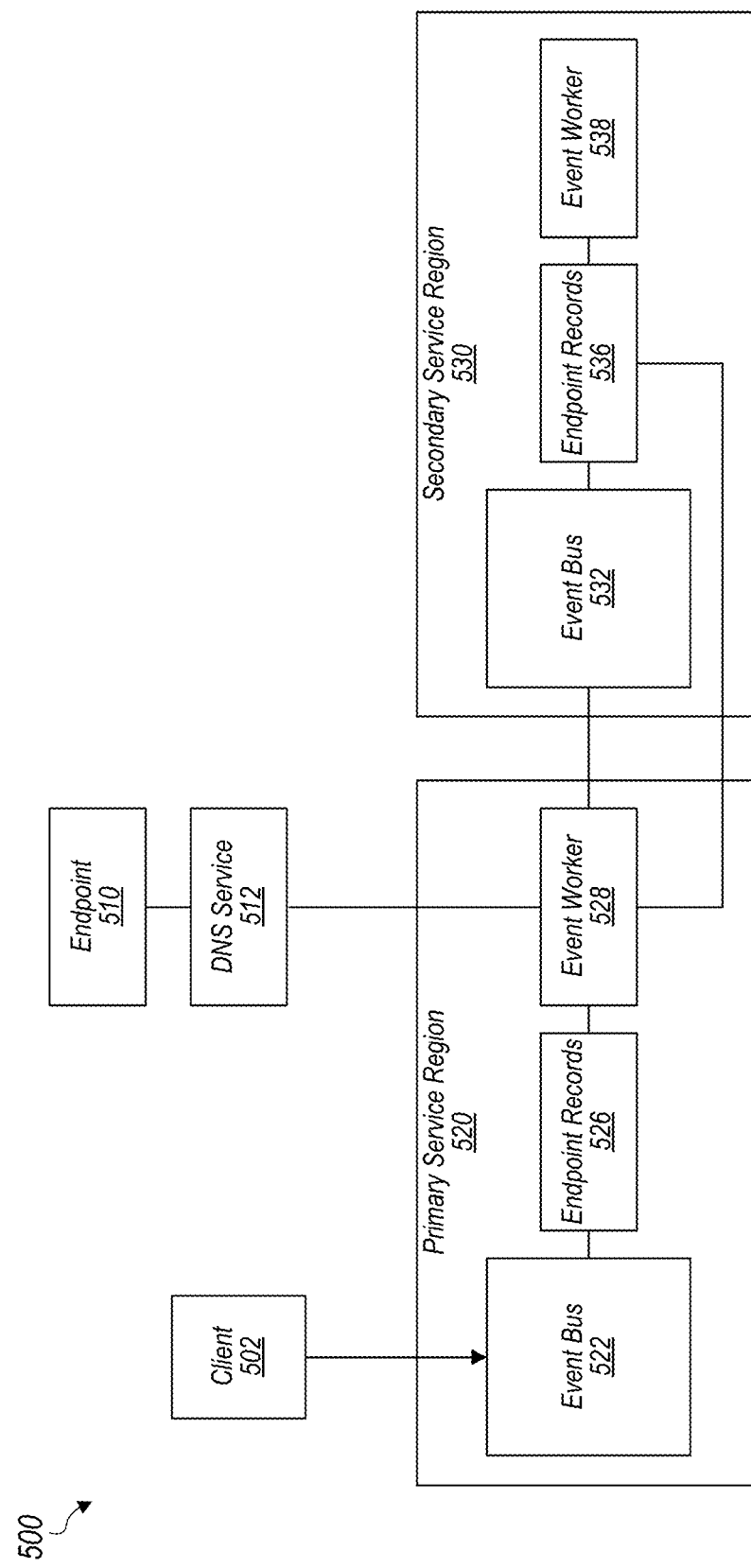
FIG. 5 is a block diagram of a provider network configured to establish endpoints to access a plurality of regions, according to some embodiments.

FIG. 5 illustrates a block diagram of a provider network having a plurality of regions configured to establish endpoints for services offered by the provider network, according to some embodiments. The plurality of regions may include a primary service region 520 and a secondary service region 530, according to some embodiments. The provider network may be configured to provide computing services to clients, including client 502.

The client 502 may send a request to establish an endpoint configured to provide access to the primary service region 520 and the secondary service region 530, according to some embodiments. For example, the client 502 may request that the endpoint 510 be created to redirect traffic from the client 502 to either the primary service region 520 or the secondary service region 530. In some embodiments, the request to establish the endpoint may include an indication of the primary service region 520 and the secondary service region 530 in addition to information indicating a given service used by the client 502. In some embodiments, the request may be received by an event bus 522 of the primary service region 520. The request may be formed in accordance with an API for endpoint management.

The event bus 522 may send at least a portion of the request to the endpoint records 526 to indicate that the endpoint 510 is associated with the primary service region 520 and the secondary service region 530, according to some embodiments. For example, the endpoint records 526 may include indications of the client 502, an address for the endpoint 510, identifiers for the primary service region 520 and the secondary service region 530, and designations as to which region is the primary region and which region is the secondary or backup region.

An event worker 528 may include one or more computing resources configured to establish the endpoint 510 on behalf of the client 502, according to some embodiments. For example, the event worker 528 may establish the endpoint 510 based on information in the endpoint records 526. In some embodiments, the event worker 528 may update DNS records with a DNS service 512. For example, the event worker 528 may update the DNS records to include DNS addresses for the primary service region 520 and the secondary service region 530.

The client 502 may also send requests to modify or terminate the endpoint 510, according to some embodiments. For example, a request to modify the endpoint 510 may include additional regions to be added to the endpoint 510. As another example, a request to modify the endpoint 510 may indicate existing regions to be removed from the endpoint 510. As yet another example, a request to terminate the endpoint 510 may include removing the endpoint 510 from the service for the client 502.

Figure 6:
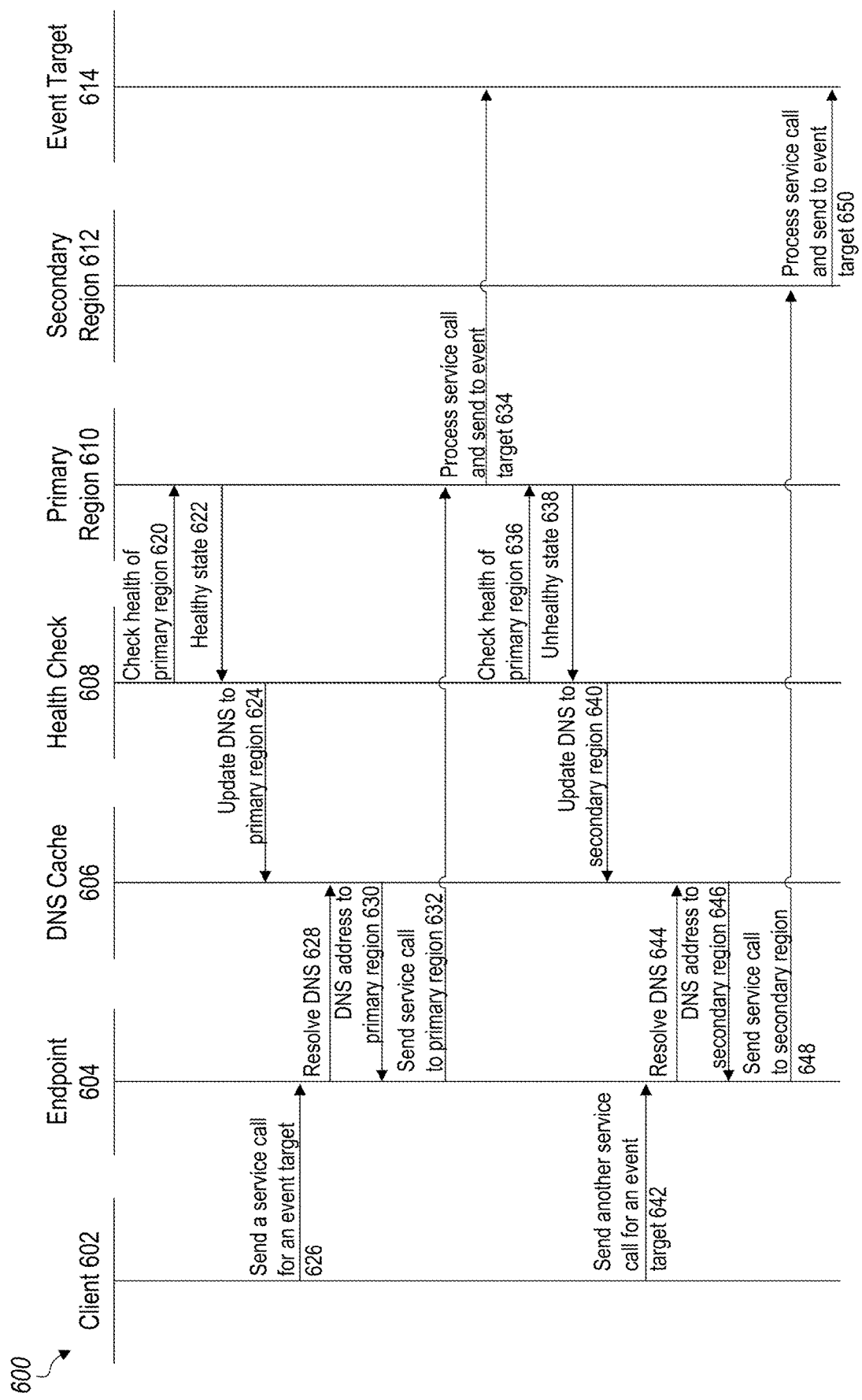
FIG. 6 illustrates a data flow for an event bus service implemented by one or more computing devices in a provider network, according to some embodiments.

FIG. 6 illustrates a data flow 600 for an event bus service implemented by one or more computing devices in a provider network, according to some embodiments. The event bus service may be provided to a client 602. The event bus service may include an endpoint 604, a DNS cache 606, and a health check 608. The event bus service may be configured to route traffic to individual regions of a plurality of regions including a primary region 610 and a secondary region 612. The plurality of regions may be configured to route events to an event target 614.

The client 602 may be configured to generate events to be sent to one or more event targets, such as the event target 614, according to some embodiments. The client 602 may include one or more computing devices configured to perform various computing tasks that may utilize one or more features of a service provided by the provider network.

The health check 608 may include one or more health monitors configured to measure performance and record metrics pertaining to one or more of the primary region 610 and the secondary region 612, according to some embodiments. In some embodiments, the health check 608 may be implemented as part of the endpoint 604. In other embodiments, the health check 608 may be implemented as part of the primary region 610 or the secondary region 612.

The health check 608 may check a health status of the primary region 610, at 620. In some embodiments, checking the health status may include measuring performance or metrics of one or more computing resources of the primary region 610. For example, the measured performance or metrics may indicate the health status based on respective performance thresholds. The primary region 610 may provide an indication of a healthy state in response to the health check 608 checking the health status, at 622.

In response to the indication of the healthy state, the health check 608 may update a DNS record in the DNS cache 606 to include a DNS address of the primary region 610, at 624. For example, the DNS cache 606 may include records for resolving addresses for directing traffic and events to the plurality of regions. Updating the DNS record may include storing an indication of an address of an event bus in the primary region 610 that is accessible by the client 602 or the endpoint 604.

The client 602 may be configured to send, to the endpoint 604, a service call for the event target 614, at 626. The service call may be generated in accordance with an application programmatic interface (API) for the service provided by the provider network. The client 602 may be configured according to a software development kit (SDK) provided for the service. In some embodiments, the service call may be an event for the service. For example, the service call may include an instruction to the service to perform one or more operations. As an illustrative example, the service call may include an instruction to read, write, or modify data stored in a database as the event target 614. The client 602 may direct the service call to an address of the endpoint 604 without the client 602 having the address for the primary region 610 or the secondary region 612. In some embodiments, the endpoint 604 may be configured to select a region of the plurality of regions to process the service call. For example, the endpoint 604 may determine whether the service call should be sent to the primary region 610 or the secondary region 612.

The endpoint 604 may be configured to resolve the DNS address for a destination region, at 630. In some embodiments, the endpoint 604 may query the DNS cache according to the selected region. For example, while the primary region 610 is in a healthy state, the endpoint 604 may select the primary region 610 to process the service call. In some embodiments, the endpoint 604 may request the DNS address for the primary region 610.

The DNS cache 606 may respond to the request by resolving and providing the DNS address for the primary region 610 to the endpoint 604, at 630. The DNS cache 606 may provide the DNS address for the primary region 610 to the endpoint 604 as part of a response to the request. The endpoint 604 may send the service call to the primary region 610, at 632. In some embodiments, the endpoint 604 may direct the service call according to the DNS address for the primary region 610. For example, the endpoint 604 may be configured to generate an encapsulated service call that includes at least a portion of the service call sent by the client 602 that is directed to the DNS address for the primary region 610.

The primary region 610 may be configured to process the service call and to send at least a portion of the service call to the event target 614, at 634. In some embodiments, the primary region 610 may include one or more computing resources configured to perform various tasks to process the service call. For example, the various tasks may include at least determining the event target for the service call and managing throughput of the service call with respect to other service calls in the primary region 610. In some embodiments, the event target 614 may send a response to one or more of the primary region 610, the endpoint 604, or the client 602 acknowledging that the service call has been received by the event target 614.

The health check 608 may check a health status of the primary region 610, at 636. In some embodiments, checking the health status may include measuring performance or metrics of one or more computing resources of the primary region 610. For example, the measured performance or metrics may indicate the health status based on respective performance thresholds. The primary region 610 may provide an indication of an unhealthy state in response to the health check 608 checking the health status, at 638.

In response to the indication of the healthy state, the health check 608 may update a DNS record in the DNS cache 606 to include a DNS address of the secondary region 612, at 640. Updating the DNS record may include storing an indication of an address of an event bus in the secondary region 612 that is accessible by the client 602 or the endpoint 604.

The client 602 may be configured to send, to the endpoint 604, a service call for the event target 614, at 642. The service call may be different from the service call sent at 626. In some embodiments, the service call may be another event for the service. For example, the service call may include an instruction to the service to perform one or more operations. As an illustrative example, the service call may include an instruction to read, write, or modify data stored in a database as the event target 614. The client 602 may direct the service call to an address of the endpoint 604 without the client 602 having the address for the primary region 610 or the secondary region 612. In some embodiments, the endpoint 604 may be configured to select a region of the plurality of regions to process the service call. For example, the endpoint 604 may determine whether the service call should be sent to the primary region 610 or the secondary region 612.

The endpoint 604 may be configured to resolve the DNS address for a destination region, at 644. In some embodiments, the endpoint 604 may query the DNS cache according to the selected region. For example, while the primary region 610 is in an unhealthy state, the endpoint 604 may select the secondary region 612 to process the service call. In some embodiments, the endpoint 604 may request the DNS address for the secondary region 612.

The DNS cache 606 may respond to the request by resolving and providing the DNS address for the secondary region 612 to the endpoint 604, at 646. The DNS cache 606 may provide the DNS address for the secondary region 612 to the endpoint 604 as part of a response to the request. The endpoint 604 may send the service call to the secondary region 612, at 648. In some embodiments, the endpoint 604 may direct the service call according to the DNS address for the secondary region 612. For example, the endpoint 604 may be configured to generate an encapsulated service call that includes at least a portion of the service call sent by the client 602 that is directed to the DNS address for the secondary region 612.

The primary region 610 may be configured to process the service call and to send at least a portion of the service call to the event target 614, at 650. In some embodiments, the secondary region 612 may include one or more computing resources configured to perform various tasks to process the service call. For example, the various tasks may include at least determining the event target for the service call and managing throughput of the service call with respect to other service calls in the secondary region 612. In some embodiments, the event target 614 may send a response to one or more of the secondary region 612, the endpoint 604, or the client 602 acknowledging that the service call has been received by the event target 614.

Figure 7:
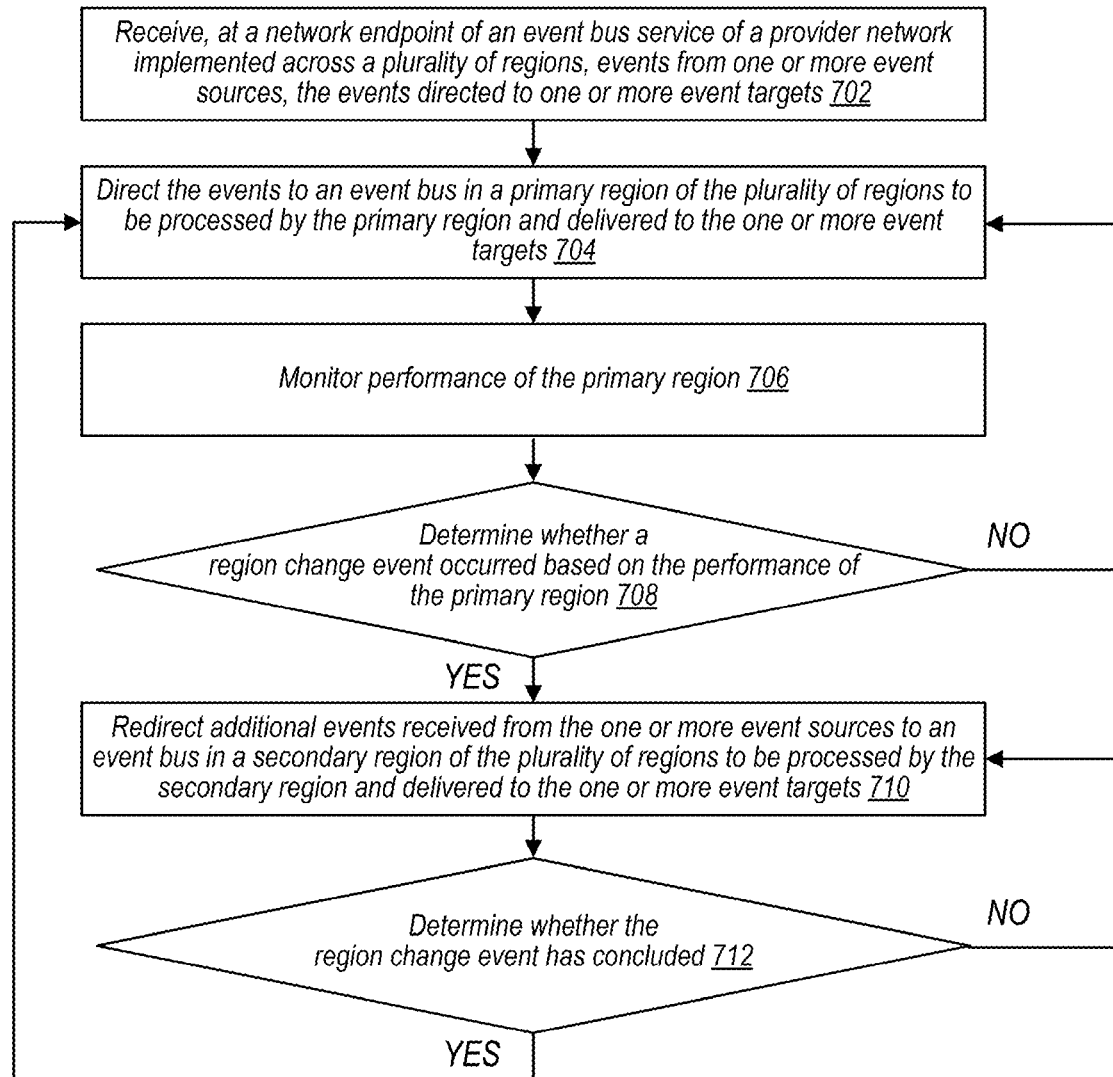
FIG. 7 is a flowchart diagram depicting a method for an endpoint of an event bus service, according to some embodiments.

FIG. 7 is a flowchart diagram depicting a method 700 for an endpoint of an event bus service, according to some embodiments. The endpoint may correspond to the endpoint 110 of FIG. 1, the endpoint 210 of FIG. 2, the control plane 310 of FIG. 3, the control plane 412 of FIG. 4, or the endpoint 604 of FIG. 6, according to some embodiments.

The method 700 may include receiving, at a network endpoint of an event bus service of a provider network implemented across a plurality of regions, events from one or more event sources, the events directed to one or more event targets, at 702. The one or more event sources may correspond to the event sources 102 of FIG. 1, the event sources 202 of FIG. 2, the event source 442, the event source 454 of FIG. 4, or the client 602 of FIG. 6, according to some embodiments. The events may correspond to the events 104 of FIG. 1, the events 204 of FIG. 2, or the workloads 302 of FIG. 3, according to some embodiments. In some embodiments, the events may include service calls according to an API for the event bus service or an underlying service, such as the one or more event targets.

The method 700 may also include directing the events to an event bus in a primary region of the plurality of regions to be processed by the primary region and delivered to the one or more event targets, at 704. The primary region may correspond to the primary service region 120 of FIG. 1, or the primary service region 610 of FIG. 6, according to some embodiments. The endpoint may be configured to direct the events to the primary region based on a determination that the primary region is a default region for the events. In some embodiments, the events may be directed to the primary region based on resolving a DNS address to the primary region. For example, the network endpoint may resolve the DNS address to the primary region and generate a downstream service call based on the resolved DNS address. The primary region may send the event to the event targets as part of processing of the events.

The method 700 may further include monitoring performance of computing resources in the primary region, at 706. In some embodiments, the performance of the computing resources in the primary region may include receiving performance information or performance metrics for one or more components of the primary region. For example, the performance information may include information tracked by a health monitor of the primary region. As another example, the performance of an application executing in the primary region may be monitored to determine the performance of the primary region. As yet another example, performance of the event bus in the primary region may be used to determine the performance of the primary region. In some embodiments, the primary region may be a primary network configured to implement operations to direct and process the events.

The method 700 may also include determining whether a region change event occurred based on the performance of the computing resources in the primary region, at 708. In some embodiments, the endpoint may include performance thresholds to compare against the performance information. For example, the performance thresholds may correspond to performance limits corresponding to a desired performance of the computing resources in the primary region. As another example, the performance limits may correspond to minimum or maximum performance requirements of the components of the primary region. In some embodiments, the region change event may include an outage of the primary region. For example, an outage of the primary region would necessitate diverting some or all of the events to a backup region. Based on a determination that the region change event has not occurred, the method 700 may return to 704 to direct additional events to the primary region.

Based on a determination that the region change event has occurred, the method 700 may also include redirecting additional events received from the one or more event sources to an event bus in a secondary region of the plurality of regions to be processed by the secondary region and delivered to the one or more event targets, at 710. In some embodiments, the events may be directed to the primary region based on resolving a DNS address to the secondary region. For example, the network endpoint may resolve the DNS address to the secondary region and generate a downstream service call based on the resolved DNS address. The secondary region may send the event to the event targets as part of processing of the events.

The method 700 may further include determining whether the region change event has concluded, at 712. In some embodiments, the network endpoint may continue monitoring performance of the primary region to determine whether the region change event has concluded. For example, the region change event may conclude based on the outage concluding at the primary region based on the performance information of the primary information satisfying one or more performance thresholds. Based on a determination that the region change event has concluded, the method 700 may return to 704 to continue directing events to the primary region. Based on a determination that the region change event has not concluded, the method 700 may return to 710 to continue directing the events to the secondary region.

Figure 8:
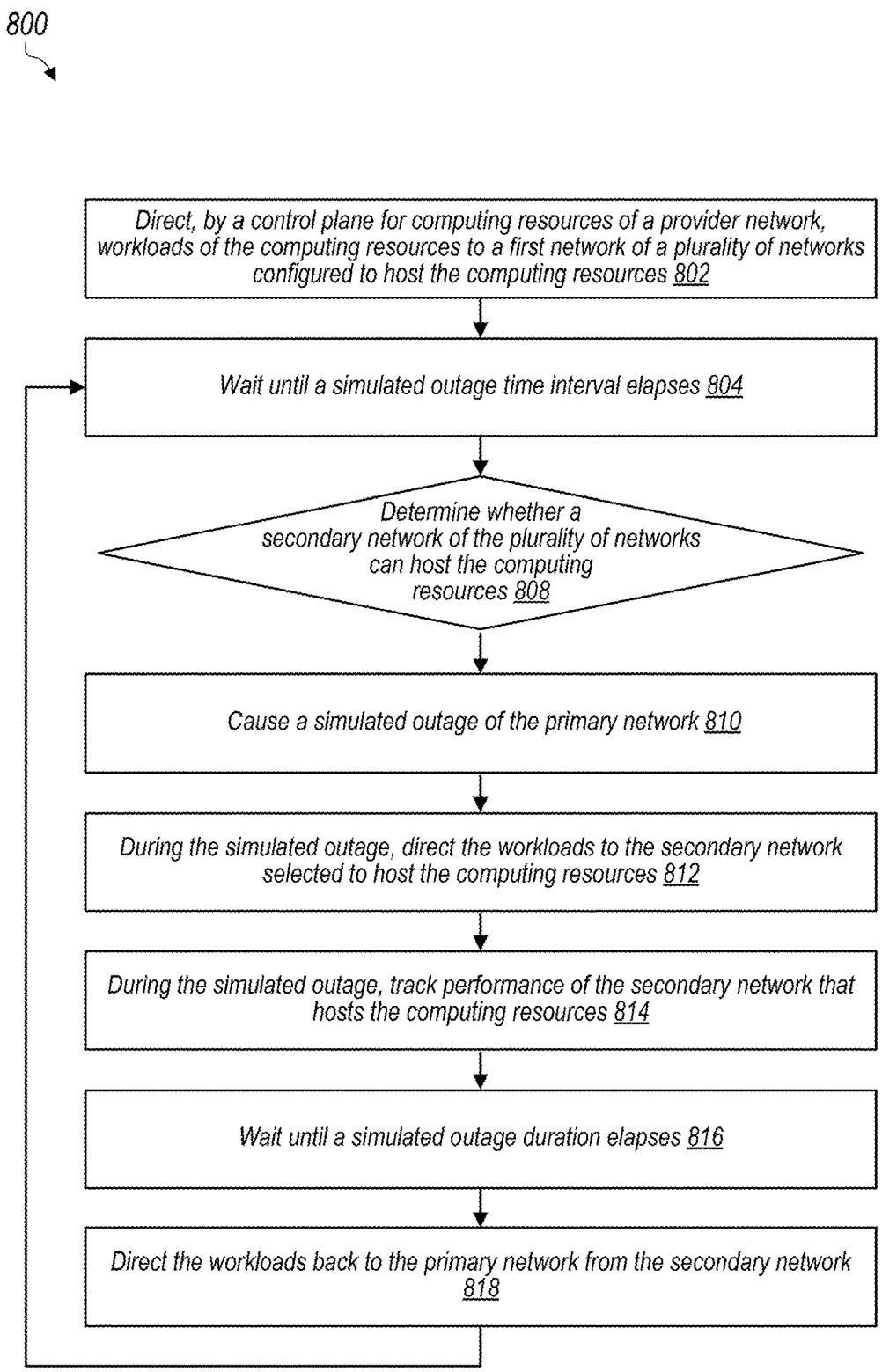
FIG. 8 illustrates a flowchart diagram of a method illustrates a flowchart diagram for a method of a control plane managing simulated outages of a plurality of networks for computing resources of a provider network, according to some embodiments.

FIG. 8 illustrates a flowchart diagram for a method 800 of a control plane managing simulated outages of a plurality of networks for computing resources of a provider network, according to some embodiments. The control plane may correspond to the endpoint 110 of FIG. 1, the endpoint 210 of FIG. 2, the control plane 310 of FIG. 3, the control plane 412 of FIG. 4, or the endpoint 604 of FIG. 6, according to some embodiments.

The method 800 may include directing, by a control plane for computing resources of a provider network, workloads of the computing resources to a first network of a plurality of networks configured to host the computing resources, at 802. The first network may correspond to the primary service region 120 of FIG. 1, the primary network 320, or the primary service region 610 of FIG. 6, according to some embodiments. The workloads may correspond to the events 104 of FIG. 1, the events 204 of FIG. 2, or the workloads 302 of FIG. 3, according to some embodiments. In some embodiments, the control plane may be configured to route the workloads to individual ones of the plurality of networks based on network selection logic. The network selection logic may be configured to select which network of the plurality of networks is used for the workloads.

The method 800 may also include waiting until a simulated outage time interval elapses, at 804. The simulated outage time interval may correspond to the simulated outage interval 114 of FIG. 1 or the simulated outage interval 314 of FIG. 3, according to some embodiments. In some embodiments, the simulated outage time interval is maintained by the control plane. The simulated outage time interval may represent a minimum time interval between simulated outages. While the control plane is waiting until the simulated outage time interval to lapse, the control plane may continue directing the workloads to the primary network The method 800 may further include determining whether a secondary network of the plurality of networks can host the computing resources, at 808. The secondary network may correspond to the secondary service region 130 of FIG. 1, the secondary service region 230 of FIG. 2, the secondary network 330 of FIG. 3, or the secondary region 612 of FIG. 6, according to some embodiments. In some embodiments, the secondary network may be a backup network to execute workloads in the event that the primary network is unavailable, regardless if the unavailability is based on an actual outage or a simulated outage. In some embodiments, the control plane may be configured to determine a health status of the secondary network to determine whether the secondary network can host the computing resources. Based on a determination that the secondary network is unable to host the computing resources, the method 800 may return to 804 to wait an additional amount of time before attempting to determine whether the secondary network is able to host the computing resources. In some embodiments, the additional amount of time may be a shorter time period than the simulated outage time interval. In other embodiments, the additional amount of time is greater than or equal to the simulated outage time interval such that an attempt to simulate an outage is skipped for one iteration.

Based on a determination that the secondary network can host the computing resources, the method 800 may further include causing a simulated outage of the primary network, at 810. In some embodiments, the simulated outage may be caused based on generated simulated performance information that indicates that the primary network has performance issues. For example, the simulated performance information may resemble performance information or metrics for networks that have performance issues, such as an outage or significantly reduced throughput. The simulated outage may cause the control plane to recognize or consider that the primary network is unavailable for executing the workloads. In another embodiment, the network selection logic may recognize that an outage is being simulated and automatically divert traffic to the secondary network without generating simulated performance information.

The method 800 may also include, during the simulated outage, directing the workloads to the secondary network selected to host the computing resources, at 812. The control plane may direct traffic of the workloads to the secondary network such that traffic originally designated for the primary network are redirected to the secondary network. During the simulated outage, the method 800 may further include, tracking performance of the secondary network that hosts the computing resources, at 814. In some embodiments, the performance of the secondary network during the simulated outage may cause the control panel to redirect the workloads back to the primary network. For example, if the secondary network is unable to handle the increased load due to the redirected traffic, the control panel may alleviate the secondary network by redirecting loads back to the primary network.

The method 800 may also include waiting until a simulated outage duration elapses, at 816. The simulated outage duration may correspond to the simulated outage duration 116 of FIG. 1 or the simulated outage duration 316 of FIG. 3, according to some embodiments. In some embodiments, the control plane may continue directing the workloads to the secondary network until the simulated outage duration elapses. In some embodiments, the simulated outage duration may have a shorter duration than the simulated outage time interval.

The method 800 may further include directing the workloads back to the primary network from the secondary network, at 818. In some embodiments, after waiting for the simulated outage duration to elapse, the control plane may return to the previous state, such as sending the workloads to the primary network. The method 800 may return to 804 to wait until the next simulated outage time interval elapses.

Figure 9:
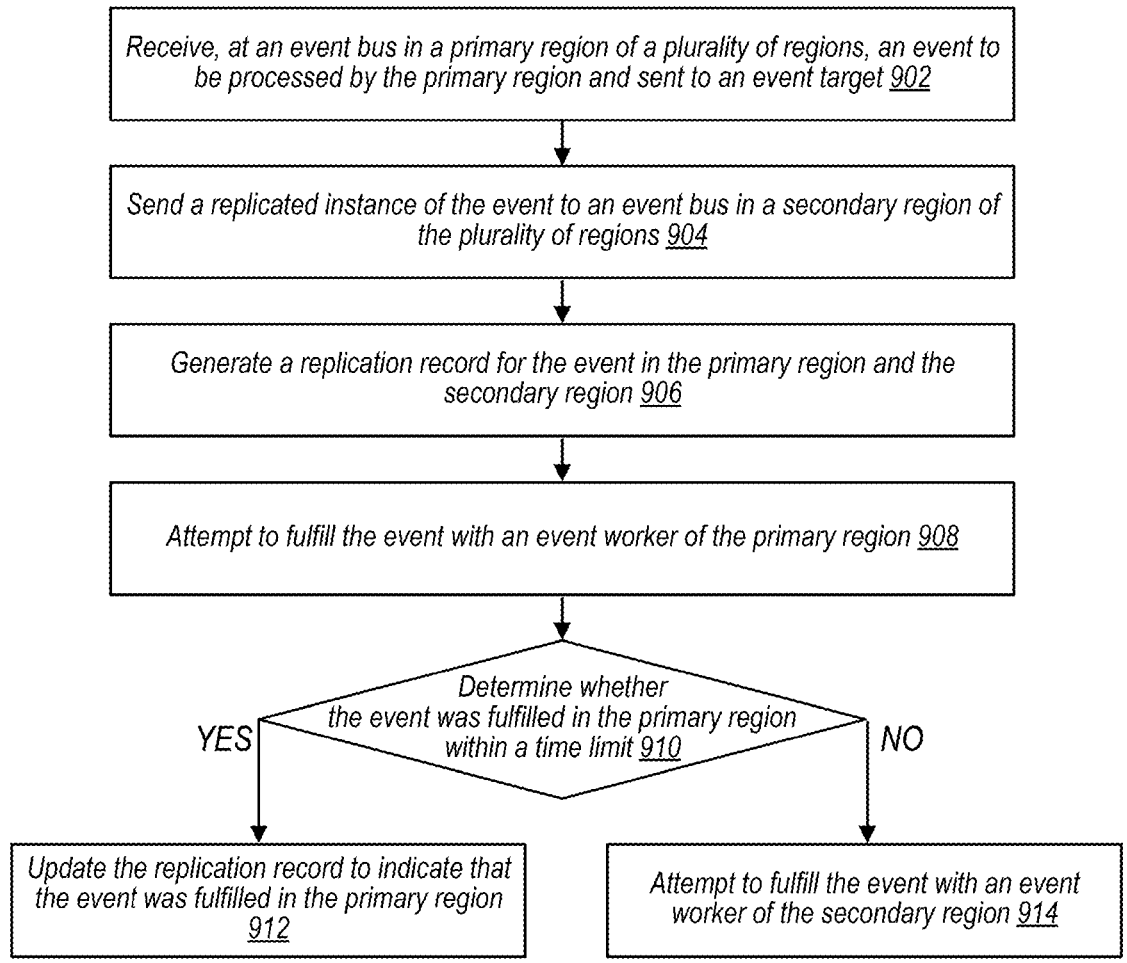
FIG. 9 illustrates a flowchart diagram of a method for an event bus in a primary region of a plurality of regions replicating events to a secondary region, according to some embodiments.

FIG. 9 illustrates a flowchart diagram of a method 900 for an event bus in a primary region of a plurality of regions replicating events to a secondary region, according to some embodiments. The event bus may correspond to the event bus 122 of FIG. 1, the event bus 222 of FIG. 2, the event bus 322 of FIG. 3, or the event bus 412 of FIG. 4, according to some embodiments. The primary region may correspond to the primary service region 120 of FIG. 1, the primary service region 220, the primary network 320, the provider network regions 200, or the primary service region 610 of FIG. 6, according to some embodiments. The secondary region may correspond to the secondary service region 130 of FIG. 1, the secondary service region 230 of FIG. 2, the secondary network 330 of FIG. 3, or the secondary region 612 of FIG. 6, according to some embodiments.

The method 900 may include receiving, at an event bus in a primary region of a plurality of regions, an event to be processed by the primary region and sent to an event target, at 902. In some embodiments, a client may provide events or service calls to the event bus in accordance with an API for the underlying service. In some situations, the event may be received from a client located within the provider network, such as a virtualized compute instance, by another service in the provider network.

The method 900 may also include sending a replicated instance of the event to an event bus in a secondary region of the plurality of regions, at 904. The event bus in the secondary region may correspond to the event bus 132 of FIG. 1, the event bus 232 of FIG. 2, or the event bus 412 of FIG. 4, according to some embodiments. The secondary region may correspond to the secondary service region 130 of FIG. 1, the secondary service region 230, the secondary network 330, the provider network regions 200, or the secondary service region 612 of FIG. 6, according to some embodiments. In some embodiments, the secondary region may be a backup region configured to process events based on a failure of the primary region. The primary region may replicate the event to backup regions in anticipation of possible failures.

The method 900 may further include generating a replication record for the event in the primary region and the secondary region, at 906. The replication record may correspond to the replication records 227 and the replication records 237 of FIG. 2, according to some embodiments. In some embodiments, the primary region and the secondary region may respectively maintain a database that includes records for each replicated event across the service.

The method 900 may also include attempting to fulfill the event with an event worker of the primary region, at 908. In some embodiments, the primary region may include one or more computing resources configured to perform various tasks to fulfill the event. In some situations, fulfillment of the event may include sending the event to the event destination or any preparations thereto.

The method 900 may further include determining whether the event was fulfilled in the primary region within a time limit, at 910. In some embodiments, the time limit may be a time-to-live (TTL) for a given event. For example, the event bus may monitor performance of the given event to determine whether the event is fulfilled when the time limit elapses. As another example, tracking of the time limit may start at the beginning of the attempt to fulfill the event. In some embodiments, the event may be regarded as fulfilled when the event is sent to the event target.

Based on a determination that the event was fulfilled in the primary region within the time limit, the method 900 may include updating the replication record to indicate that the event was fulfilled in the primary region, at 912. In some embodiments, the event bus may indicate that the event was fulfilled in the replication record by appending or modifying data to indicate a completion status of the event. The replication record may also be propagated to other regions, such as the secondary region, to indicate that the event was fulfilled.

Based on a determination that the event was not fulfilled in the primary region within the time limit, the method 900 may include attempting to fulfill the event with an event worker of the secondary region, at 914. In some embodiments, the event worker of the secondary region may be configured to attempt to fulfill the event based on the replicated instance of the event sent by the event bus of the primary region. For example, the replicated instance of the event may include information pertaining to the event such that the secondary region may be able to process and fulfill the event in a manner similar to the primary region. In some embodiments, the event bus may update the replication record to specifically indicate that the event was unfulfilled. In other embodiments, the unmodified replicated record may imply that the event was unfulfilled.

Figure 10:
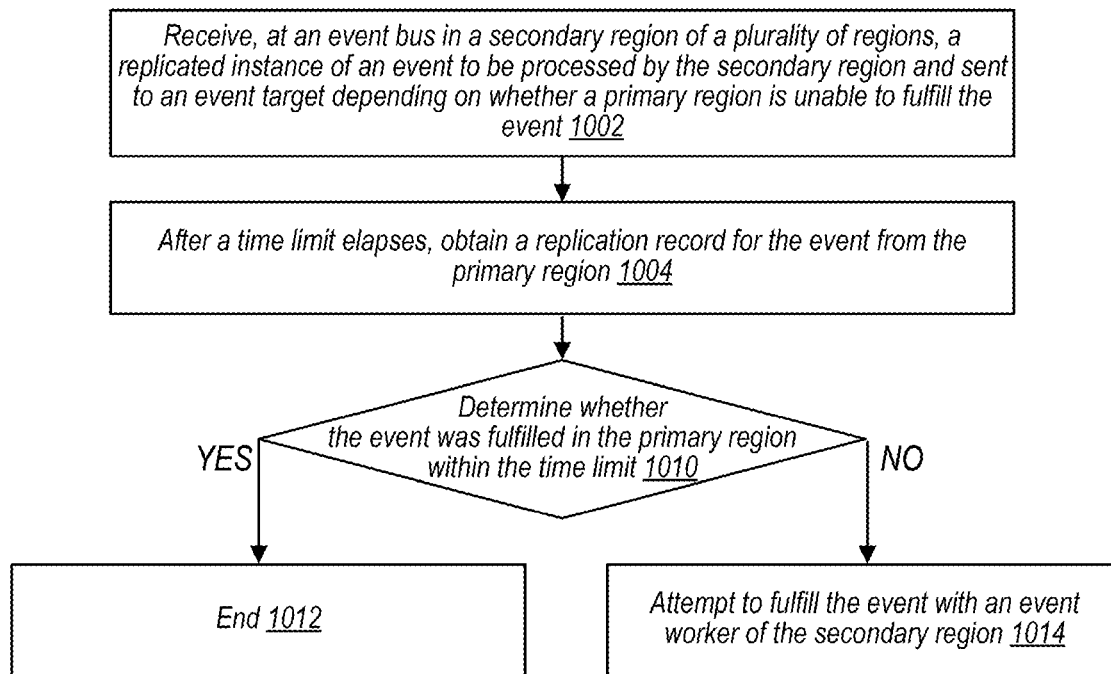
FIG. 10 illustrates a flowchart diagram for a method for an event bus in a secondary region to fulfill replicated events in a provider network, according to some embodiments.
Figure 11:
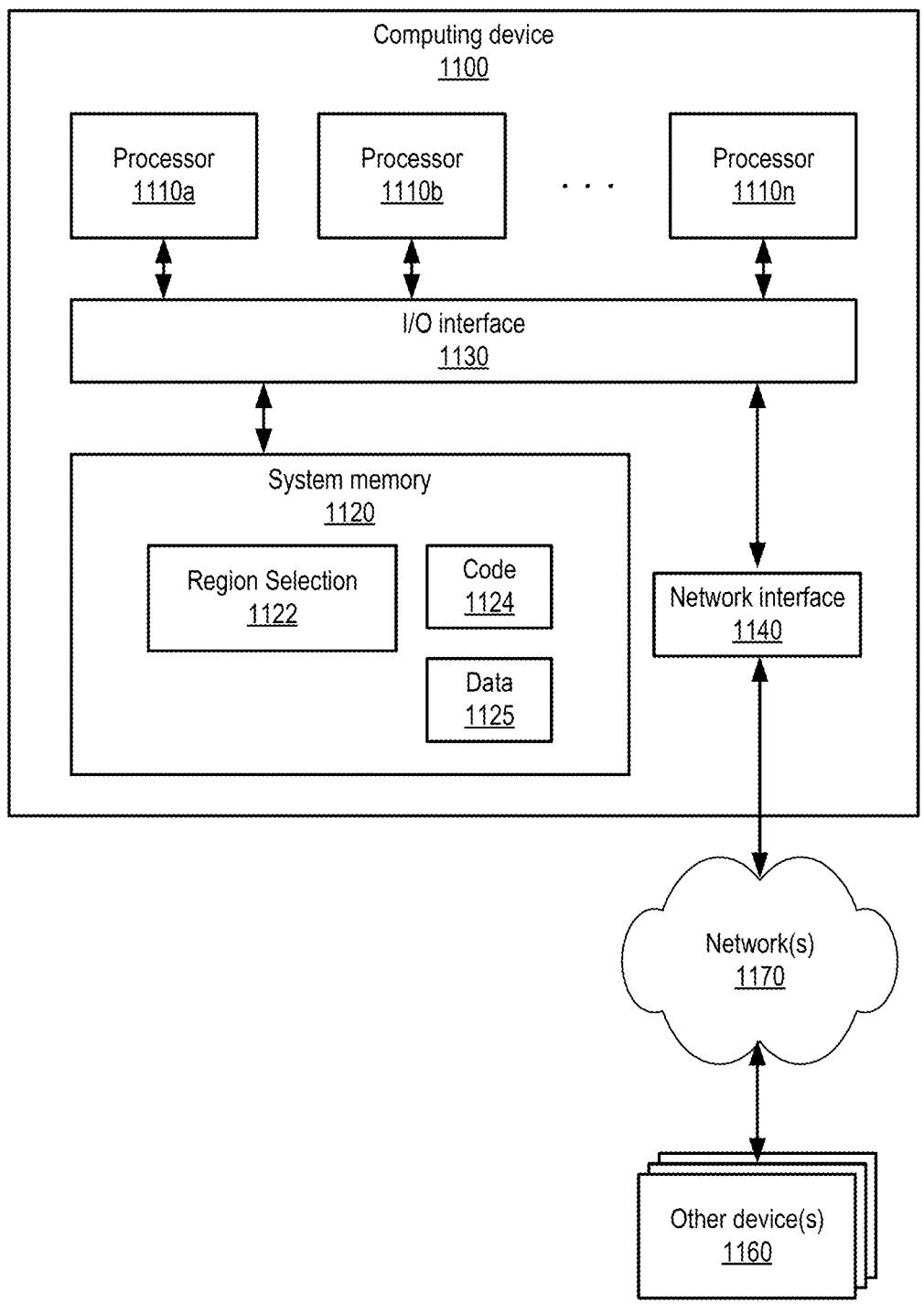
FIG. 11 illustrates a block diagram illustrating an example computer system that may be used in some embodiments.

FIG. 10 illustrates a flowchart diagram of a method 1000 for an event bus in a secondary region to fulfill replicated events in a provider network, according to some embodiments. The event bus in the secondary region may correspond to the event bus 132 of FIG. 1, the event bus 232 of FIG. 2, or the event bus 412 of FIG. 4, according to some embodiments. The secondary region may correspond to the secondary service region 130 of FIG. 1, the secondary service region 230, the secondary network 330, the provider network regions 200, or the secondary service region 612 of FIG. 6, according to some embodiments.

The method 1000 may include receiving, at an event bus in a secondary region of a plurality of regions, a replicated instance of an event to be processed by the secondary region and sent to an event target depending on whether a primary region is unable to fulfill the event, at 1002. In some embodiments, the event bus may receive the replicated instance of the event from a primary region of the plurality of regions. For example, an event bus of the primary region may send the replicated instance of the event such that the secondary region may be a backup region to the primary region in the case of failure of the primary region. As an illustrative example, the replicated instance may be provided as described with respect to 904 of FIG. 9.

The method 1000 may also include, after a time limit elapses, obtaining a replication record for the event from the primary region, at 1004. The replication record may correspond to the replication records 227 of FIG. 2, according to some embodiments. In some embodiments, the time limit may be indicated as part of the replicated instance. In other embodiments, the time limit may be indicated as part of metadata for the event. The time limit may correspond to a TTL such that the secondary region may determine whether the secondary region should process the event after the time limit elapses. In other embodiments, the replication record may be obtained in response to other criteria than a time limit. For example, in response to detecting an interrupt-based command, the replication record may be obtained. The command may be manually or automatically sent to the event bus. In other embodiments, the replication record may be obtained in response to event-based interrupts.

The method 1000 may further include determining whether the event was fulfilled in the primary region within the time limit, at 1010. In some embodiments, the event bus may analyze the retrieved replication record to determine whether the event was fulfilled. For example, the replication record may include information that indicates a completion status of the event. The completion status may indicate whether the primary region has fulfilled the event by sending the event to the event target. By waiting for the time limit to elapse, the event bus may determine that the primary region has not fulfilled the event within the time limit based on the replication record not indicating that the event was fulfilled.

Based on a determination that the event was fulfilled in the primary region within the time limit, the method 1000 may conclude at 1012. In some embodiments, the secondary region does not need to perform any operations relating to the replicated instance of the event if the primary region has already fulfilled the event to avoid duplicative or repetitive operations from consuming operational resources. In some embodiments, the event bus may delete the replicated instance of the event from a message queue or other processing queue for the secondary region.

Based on a determination that the event was not fulfilled in the primary region within the time limit, the method 1000 may include attempting to fulfill the event with an event worker of the secondary region, at 1014. The event worker may correspond to the event worker 138 of FIG. 1, the event worker 238 of FIG. 2, or the computing resources 322 of FIG. 3, according to some embodiments. In some embodiments, the event worker may be configured to send the event to the event target.

In the illustrated embodiment, computer system 1100 includes one or more processors 1110 coupled to a system memory 1120 via an input/output (I/O) interface 1130. Computer system 1100 further includes a network interface 1140 coupled to I/O interface 1130. In some embodiments, computer system 1100 may be illustrative of servers implementing enterprise logic or downloadable application, while in other embodiments servers may include more, fewer, or different elements than computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions on or across the processors 1110. For example, in various embodiments, processors 1110 may be embedded processors implementing any of a variety of instruction set architectures (ISAs), such as the x86, x86-64, ARM, PowerPC, SPARC, or MIPS ISAs, or any other suitable ISA. In multiprocessor systems, each of processors 1110 may commonly, but not necessarily, implement the same ISA.

System memory 1120 may be configured to store instructions and data accessible by processor 1110. In various embodiments, system memory 1120 may be implemented using one or more of any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the management of securely memory compression are shown stored within system memory 1120 as program instructions 1124. In some embodiments, system memory 1120 may include data 1125 which may be configured as described herein. In some embodiments, system memory 1120 may include region selection logic 1122. For example, region selection logic 1122 may perform the functions of the region selection logic 112 of FIG. 1, the functions of the region selection logic 312 of FIG. 3, the functions of the control plane 412 of FIG. 4, or the endpoint 604 of FIG. 6.

In one embodiment, I/O interface 1130 may be configured to coordinate I/O traffic between processor 1110, system memory 1120 and any peripheral devices in the system, including through network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments, some or all of the functionality of I/O interface 1130, such as an interface to system memory 1120, may be incorporated directly into processor 1110.

Network interface 1140 may be configured to allow data to be exchanged between computer system 1100 and other devices attached to a network, such as between client devices (e.g., 1160, etc.) and other computer systems, or among hosts, for example. In particular, network interface 1140 may be configured to allow communication between computer system 1100 and/or various other devices 1160 (e.g., I/O devices). Other devices 1160 may include scanning devices, display devices, input devices and/or other communication devices, as described herein. Network interface 1140 may commonly support one or more wireless networking protocols (e.g., Wi-Fi/IEEE 802.11, or another wireless networking standard). However, in various embodiments, network interface 1140 may support communication via any suitable wired or wireless general data networks 1170, such as other types of Ethernet networks, for example. Additionally, network interface 1140 may support communication via telecommunications/telephony networks such as analog voice networks or digital fiber communications networks, via storage area networks such as Fibre Channel SANs, or via any other suitable type of network and/or protocol.

In some embodiments, system memory 1120 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1100 via I/O interface 1130. A computer-readable storage medium may also include any volatile or non-volatile media such as RAM (e.g. SDRAM, DDR SDRAM, RDRAM, SRAM, etc.), ROM, etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, which may be implemented via network interface 1140.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 1100, including one or more processors 1110 and various other devices (though in some embodiments, a computer system 1100 implementing an I/O device 1150 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1100. In general, an I/O device (e.g., cursor control device, keyboard, or display(s) may be any device that can communicate with elements of computing system 1100.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on one or more computer-readable storage media coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:

one or more processors; and a memory storing instructions that, when executed by on or across the one or more processors, cause the one or more processors to implement a control plane for a plurality of computing resources of a provider network, wherein the provider network is implemented across a plurality of regions, wherein the control plane is configured to:

cause simulated outages of a primary region of the plurality of regions selected to host the plurality of different computing resources, wherein the simulated outages are initiated at different periods of time and when a performance of one or more secondary regions of the plurality of regions satisfies one or more performance thresholds, and wherein the one or more secondary regions of the plurality of regions are selected to host the plurality of computing resources for the simulated outages of the primary region;

during the simulated outages of the primary region:

move respective workloads of the plurality of different computing resources to be performed in the one or more secondary regions; and track a performance of the one or more secondary regions hosting the moved respective workloads of the plurality of computing resources; and after completing individual ones of the simulated outages of the primary region, move, by the control plane, the respective workloads of the plurality of different computing resources back to the primary region.

2. The system of claim 1, wherein the different periods of time are separated by a simulated outage interval, and wherein individual ones of the simulated outages are completed after a simulated outage duration elapses.

3. The system of claim 1, wherein the control plane is further configured to:

monitor the performance of the one or more secondary regions during one or more time periods while the primary region is hosting the plurality of computing resources;

determine whether the performance of the one or more secondary regions does not satisfy one or more performance thresholds; and based on a determination that the performance of the one or more secondary regions does not satisfy the one or more performance thresholds, disable the simulated outages until the performance of the one or more secondary regions satisfies the one or more performance thresholds.

4. The system of claim 1, wherein the control plane is further configured to:

monitoring the performance of the primary region;

based on the performance of the primary region, detect a region change event occurred at the primary region; and in response to detection of the region change event, moving the respective workloads of the plurality of computing resources to be performed in the one or more secondary regions.

5. The system of claim 4, wherein to cause the simulated outages, the control plane is further configured to:
generate a simulated indication of the region change event; and
detect the region change event according to the simulated indication.

6. A method, comprising:
causing, by a control plane for a plurality of computing resources, simulated outages of a primary network of a plurality of networks selected to host the plurality of different computing resources, wherein the simulated outages are initiated at different periods of time and when a performance of one or more secondary networks of the plurality of networks satisfies one or more performance thresholds, and wherein the one or more secondary networks of the plurality of networks are selected to host the plurality of computing resources for the simulated outages of the primary network;
during the simulated outages of the primary network, moving, by the control plane, respective workloads of the plurality of computing resources to be performed in the one or more secondary networks; and
after completing individual ones of the simulated outages of the primary network, moving, by the control plane, the respective workloads of the plurality of computing resources back to the primary network.

7. The method of claim 6, wherein the different periods of time are separated by a simulated outage interval, and wherein individual ones of the simulated outages are completed after a simulated outage duration elapses.

8. The method of claim 6, further comprising:
tracking the performance of the one or more secondary networks during one or more time periods while the primary network is hosting the plurality of computing resources;
determining whether the performance of the one or more secondary networks does not satisfy the one or more performance thresholds; and
based on a determination that the performance of the one or more secondary networks does not satisfy the one or more performance thresholds, disabling the simulated outages until the performance of the one or more secondary networks satisfies the one or more performance thresholds.

9. The method of claim 6, further comprising:
monitoring performance of the primary network;
based on the performance of the primary network, detecting a network change event occurred at the primary network; and
in response to detection of the network change event, moving the respective workloads of the plurality of computing resources to be performed in the one or more secondary networks.

10. The method of claim 9, wherein causing the simulated outages comprises:
generating a simulated indication of the network change event; and
detecting the network change event according to the simulated indication.

11. The method of claim 10, wherein completing the individual ones of the simulated outages comprises:
removing the simulated indication of the network change event; and
continuing the monitoring of the performance of the primary network.

12. The method of claim 6, further comprising:
receiving indications of the respective workloads while the simulated outages are not active; and
direct the respective workloads to the primary network selected to host the plurality of different computing resources when the simulated outages are not active.

13. The method of claim 6, further comprising:
receiving a request to temporarily disable the simulated outages for an opt-out duration; and
disabling the simulated outages until the opt-out duration elapses.

14. One or more computer-readable storage media storing instructions that, when executed on or across one or more processors, cause the one or more processors to:
cause simulated outages of a primary network of a plurality of networks selected to host a plurality of different computing resources, wherein the simulated outages are initiated at different periods of time and when a performance of one or more secondary networks of the plurality of networks satisfies one or more performance thresholds, and wherein one or more secondary networks of the plurality of networks are selected to host the plurality of computing resources for the simulated outages of the primary network;
during the simulated outages of the primary network, move respective workloads of the plurality of computing resources to be performed in the one or more secondary networks; and
after completing individual ones of the simulated outages of the primary network, move the respective workloads of the plurality of computing resources back to the primary network.

15. The one or more computer-readable storage media of claim 14, wherein the different periods of time are separated by a simulated outage interval, and wherein individual ones of the simulated outages are completed after a simulated outage duration elapses.

16. The one or more computer-readable storage media of claim 14, further comprising instructions that, when executed on or across the one or more processors, cause the one or more processors to:
monitor performance of the one or more secondary networks during one or more time periods while the primary network is hosting the plurality of computing resources;
determine whether the performance of the one or more secondary networks does not satisfy the one or more performance thresholds; and
based on a determination that the performance of the one or more secondary networks does not satisfy the one or more performance thresholds, disable the simulated outages until the performance of the one or more secondary networks satisfies the one or more performance thresholds.

17. The one or more computer-readable storage media of claim 14, further comprising instructions that, when executed on or across the one or more processors, cause the one or more processors to:
monitor performance of the primary network;
based on the performance of the primary network, detect a network change event occurred at the primary network; and
in response to detection of the network change event, move the respective workloads of the plurality of computing resources to be performed in the one or more secondary networks.

18. The one or more computer-readable storage media of claim 14, further comprising instructions that, when executed on or across the one or more processors, cause the one or more processors to:
    to cause the simulated outages:
        generate a simulated indication of the network change event; and
        detect the network change event according to the simulated indication.

19. The one or more computer-readable storage media of claim 14, further comprising instructions that, when executed on or across the one or more processors, cause the one or more processors to:
    receive indications of the respective workloads while the simulated outages are not active; and
    direct the respective workloads to the primary network selected to host the plurality of different computing resources when the simulated outages are not active.

20. The one or more computer-readable storage media of claim 14, further comprising instructions that, when executed on or across the one or more processors, cause the one or more processors to:
    receive a request to temporarily disable the simulated outages for an opt-out duration; and
    disable the simulated outages until the opt-out duration elapses.

\* \* \* \* \*